(12) United States Patent
Kishi et al.

(10) Patent No.: US 9,182,522 B2
(45) Date of Patent: Nov. 10, 2015

(54) HARD COAT FILM, POLARIZING PLATE, IMAGE DISPLAY DEVICE, AND METHOD FOR PRODUCING HARD COAT FILM

(75) Inventors: Atsushi Kishi, Ibaraki (JP); Hiroyuki Takemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 13/639,348

(22) PCT Filed: Apr. 13, 2011

(86) PCT No.: PCT/JP2011/059143
§ 371 (c)(1),
(2), (4) Date: Oct. 4, 2012

(87) PCT Pub. No.: WO2011/129354
PCT Pub. Date: Oct. 20, 2011

(65) Prior Publication Data
US 2013/0029118 A1 Jan. 31, 2013

(30) Foreign Application Priority Data

Apr. 15, 2010 (JP) .................. 2010-093712

(51) Int. Cl.
*B32B 7/02* (2006.01)
*G02B 1/10* (2015.01)
*G02B 5/30* (2006.01)
(Continued)

(52) U.S. Cl.
CPC .............. *G02B 1/105* (2013.01); *B32B 17/064* (2013.01); *G02B 5/3025* (2013.01); *G02F 1/133528* (2013.01); *G02F 2201/50* (2013.01); *Y10T 428/24942* (2015.01)

(58) Field of Classification Search
USPC .................................. 428/212; 359/580–586
See application file for complete search history.

(56) References Cited

U.S. PATENT DOCUMENTS 5,472,795 A 12/1995 Atita
8,446,673 B2 5/2013 Yoshihara
(Continued)

FOREIGN PATENT DOCUMENTS

CN 101019043 A 8/2007
EP 1804087 A1 7/2007
(Continued)

OTHER PUBLICATIONS

International Search Report for PCT/JP2011/059143, mailing date of Jun. 21, 2011.
(Continued)

*Primary Examiner* — Maria Veronica Ewald
*Assistant Examiner* — Tong Guo
(74) *Attorney, Agent, or Firm* — Westerman, Hattori, Daniels & Adrian, LLP

(57) ABSTRACT

The present invention provides a hard coat film in which the generation of interference fringes can be reliably prevented. The hard coat film 1 of the present invention includes a transparent film 2 and a hard coat layer 3 provided on the transparent film 2, wherein an interface 5 that can be detected to form by a reflection spectrum analysis exists between the transparent film 2 and the hard coat layer 3, and a refractive index continuously varies in the thickness direction in a region 31 from the interface 5 to a thickness-wise middle part of the hard coat layer 3 without forming an interface that can be detected by the reflection spectrum analysis.

9 Claims, 13 Drawing Sheets

(51) Int. Cl.
    *B32B 17/06*   (2006.01)
    *G02F 1/1335*  (2006.01)

(56) References Cited

U.S. PATENT DOCUMENTS

| | | | |
|---|---|---|---|
| 2003/0116765 A1* | 6/2003 | Koo et al. ............... | 257/59 |
| 2005/0063057 A1 | 3/2005 | Hong et al. | |
| 2006/0074172 A1* | 4/2006 | Yang et al. ............... | 524/492 |
| 2008/0131726 A1 | 6/2008 | Derflinger | |
| 2008/0204882 A1 | 8/2008 | Nakamura et al. | |
| 2009/0061114 A1 | 3/2009 | Ando | |
| 2009/0075074 A1 | 3/2009 | Horio et al. | |
| 2009/0156705 A1 | 6/2009 | Yoneyama et al. | |
| 2010/0171908 A1* | 7/2010 | Yoshihara ............... | 349/96 |
| 2010/0208350 A1* | 8/2010 | Yoshihara ............... | 359/585 |

FOREIGN PATENT DOCUMENTS

| | | | |
|---|---|---|---|
| JP | 7-56002 A | 3/1995 | |
| JP | 2003-39014 A | 2/2003 | |
| JP | 2003-131007 A | 5/2003 | |
| JP | 2003-222701 A | 8/2003 | |
| JP | 2004-263082 A | 9/2004 | |
| JP | 2005-266232 A | 9/2005 | |
| JP | 2009-086660 A | 4/2009 | |
| JP | 2009-143048 A | 7/2009 | |
| TW | 200512512 A | 9/1992 | |
| WO | 2006/098363 A1 | 9/2006 | |

OTHER PUBLICATIONS

Notice of Statement of Information dated Jan. 9, 2015, issued in Japanese Application No. 2011-088843, w/English translation. (11 pages).

Office Action dated Mar. 5, 2014, issued in Chinese Patent Application No. 201180019142.7 with Partial English Translation (11 pages).

Japanese Notice of Statement of Information, issued in Japanese Patent Application No. 2011-088843, w/English translation (2 pages).

Japanese Office Action dated Oct. 24, 2014, issued in corresponding Japanese Patent Application No. 2011-088843, w/partial English translation (6 pages).

Chinese Office Action dated Oct. 14, 2014, issued in corresponding Chinese Patent Application No. 201180019142.7, w/partial English translation (12 pages).

Decision of Refusal dated May 29, 2015, issued in corresponding Japanese Patent Application No. 2011-088843 with English translation (6 pages).

Taiwanese Office Action dated Jul. 20, 2015, issued in counterpart Taiwanese Patent Application No. 100112981 (5 pages), with Partial English translation.

* cited by examiner

[Example 2]

[Example 2]

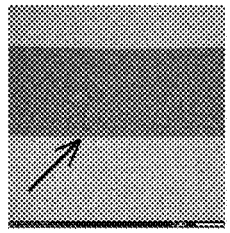
Fig.15(a) Example 1
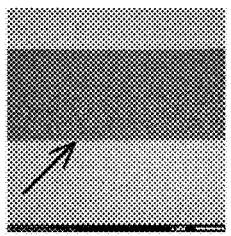
Fig.15(b) Example 2
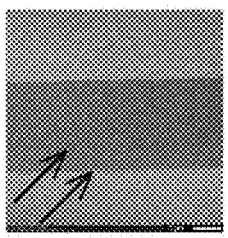
Fig.15(c) Comparative Example 1
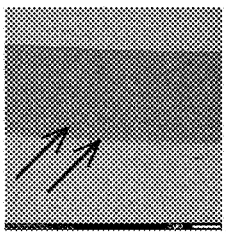
Fig.15(d) Comparative Example 2
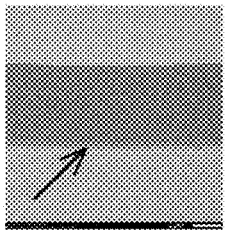
Fig.15(e) Comparative Example 3
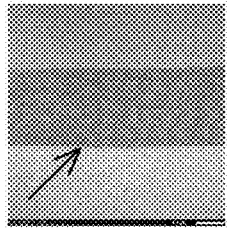
Fig.15(f) Comparative Example 4
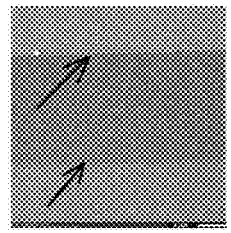
Fig.15(g) Comparative Example 5

HARD COAT FILM, POLARIZING PLATE, IMAGE DISPLAY DEVICE, AND METHOD FOR PRODUCING HARD COAT FILM

TECHNICAL FIELD

The present invention relates to a hard coat film, a polarizing plate and an image display device including the same, and a method for producing a hard coat film.

BACKGROUND ART

Conventionally, in order to prevent scratches or light reflection on screens of image display devices, touch panels, or other members, a hard coat film is sometimes provided on such a member.

The hard coat film includes a transparent film and a hard coat layer provided on the transparent film. The hard coat layer is usually formed of a thin coating film obtained by forming a film of about 2 μm to 10 μm from a hard coat layer-forming material containing an ionizing radiation-curable resin such as a heat-curable resin or a UV-curable resin.

In the former hard coat film, a refractive index difference exists between a transparent film and a hard coat layer. Therefore, there is a problem in that the presence of slight irregularities in the surface of the hard coat layer leads to the generation of interference fringes. In addition, "interference fringes" means a striped appearance caused by the reflection of light from a three-wavelength source, such as a fluorescent lamp, on the surface of the hard coat layer, etc. Such interference fringes cause a decrease in the visibility of the surface of the hard coat film.

In a known hard coat film, in order to prevent the generation of interference fringes, the surface of the transparent film is swollen by a hard coat layer-forming material to eliminate an interface between the hard coat layer and the transparent film, whereby the refractive index near the interface continuously varies (Patent Documents 1 and 2).

In another known hard coat film, in order to prevent the generation of interference fringes, an optical adjustment layer is provided between the transparent film and the hard coat layer to eliminate the interface between the transparent film and the hard coat layer (Patent Document 3).

However, the former hard coat films mentioned above do not sufficiently prevent the generation of interference fringes. Further, the hard coat film of Patent Document 3 requires an additional step of providing an optical adjustment layer during its production.

Meanwhile, in a hard coat film, it is necessary that the hard coat layer has high hardness for the purpose of preventing scratches, and, in addition, it is also necessary that the hard coat layer and the transparent film are sufficiently attached to each other.

[Patent Document 1]
Japanese Unexamined Patent Publication No. 2004-263082
[Patent Document 2]
Japanese Unexamined Patent Publication No. 2003-131007
[Patent Document 3]
PCT International Publication No. WO 2006/098363

It is an object of the present invention to provide a hard coat film in which the generation of interference fringes can be further suppressed and which has high hardness and excellent adhesion.

It is another object of the present invention to provide a polarizing plate and an image display device using the hard coat film.

It is another object of the present invention to provide a method for producing a hard coat film in which the generation of interference fringes is suppressed.

It is considered that in the hard coat films of Patent Documents 1 and 2 mentioned above, interference fringes due to the interface that separates a transparent film from a hard coat layer can be suppressed.

However, in such a hard coat film, as a whole, interference fringes are still present.

The present inventors have presumed that this is attributable to the presence of a new additional interface in addition to the interface that separates a transparent film from a hard coat layer. Specifically, the hard coat films of Patent Documents 1 and 2 are obtained by applying a hard coat layer-forming material, which contains a curable resin and a solvent, onto a transparent film, and then curing the coating film. The solvent swells the surface of the transparent film, and therefore, a transparent film-forming component elutes into the coating film. Then, it is presumed that the transparent film-forming component that has diffused and penetrated into the coating film causes the formation of the new additional interface mentioned above. Because of the presence of the new additional interface, practically, the former hard coat film is not capable of sufficiently suppressing the generation of interference fringes. Particularly in the case where the hard coat layer has a small thickness, interference fringes are likely to occur due to the additional interface. Such interference fringes are prominently visible in the appearance particularly when an antireflection layer is provided on the surface of the hard coat layer.

Based on this knowledge, inventors of the present invention solved the problems with the following methods.

A hard coat film according to a first aspect of the present invention includes a transparent film and a hard coat layer provided on the transparent film, wherein an interface that can be detected by a reflection spectrum analysis exists between the transparent film and the hard coat layer and a refractive index continuously varies in the thickness direction in a region from the interface to a thickness-wise middle part of the hard coat layer without forming an interface that can be detected by the reflection spectrum analysis.

A hard coat film according to a second aspect of the present invention includes a transparent film and a hard coat layer provided on the transparent film, wherein an interface that can be detected by a reflection spectrum analysis exists between the transparent film and the hard coat layer and a transparent film-forming component and a hard coat layer-forming component are present in a region from the interface to a thickness-wise middle part of the hard coat layer, and the transparent film-forming component in the region decreases toward a surface of the hard coat layer without forming an interface that can be detected by the reflection spectrum analysis.

In a preferable hard coat film of the present invention, the hard coat layer has a thickness of 3 μm to 15 μm.

In a preferable hard coat film of the present invention, an antireflection layer is further provided on a surface of the hard coat layer.

In a preferable hard coat film of the present invention, a transparent film-forming component and a hard coat layer-forming component are present in a region from the interface to a thickness-wise middle part of the transparent film, and the transparent film-forming component in the region decreases toward a surface of the hard coat layer.

According to another aspect of the present invention, a polarizing plate is provided.

The polarizing plate includes the hard coat film mentioned above.

According to another aspect of the present invention, an image display device is provided.

The image display device includes the hard coat film mentioned above.

According to another aspect of the present invention, a method for producing a hard coat film is provided.

The method for producing a hard coat film of the present invention includes a coating film-forming step of applying a hard coat layer-forming material onto a transparent film to form a coating film having a predetermined thickness, the hard coat layer-forming material including a curable compound containing a low molecular-weight component with a molecular weight of 800 or less and a solvent containing a good solvent for the transparent film, and a curing step of curing the coating film to form a hard coat layer on the transparent film, wherein the low molecular-weight component and good solvent contained in the hard coat layer-forming material and the thickness of the coating film satisfy the relationships of the following formulae 1 and 2, Formula 1: $Y \geq -4.274 \ln(X) + 11.311$ and Formula 2: $Y \leq -4.949 \ln(X) + 15.474$. In the formula, the "Y" represents b×t, the "X" represents a×t, the "a" represents the content ratio of the low molecular-weight component based on the total amount of the curable compound taken as 1, the "b" represents the content ratio of the good solvent based on the total amount of the hard coat layer-forming material taken as 1, and the "t" represents the thickness μm of the coating film.

In a preferable method for producing a hard coat film of the present invention, the "a" is 0.3 or more and 1 or less and the "b" is 0.05 or more and 0.5 or less.

In a preferable method for producing a hard coat film of the present invention, the low molecular-weight component is a UV-curable resin monomer or oligomer.

The hard coat film of the present invention is resistant to scratches and also is capable of further suppressing the generation of interference fringes. Further, the hard coat film is also excellent in terms of adhesion between the transparent film and the hard coat layer and thus has excellent durability.

The polarizing plate and an image display device including the hard coat film have excellent scratch resistance, durability, and visibility.

The production method of the present invention makes it possible to easily produce a hard coat film in which the generation of interference fringes is suppressed.

BRIEF DESCRIPTION OF THE DRAWINGS

FIGS. 15(a) to 15(g) are each a cross-sectional photograph of each of the hard coat films of Examples 1 and 2 and Comparative Examples 1 to 4 and 9.

DESCRIPTION OF EMBODIMENTS

[Hard Coat Film]

Figure 1:
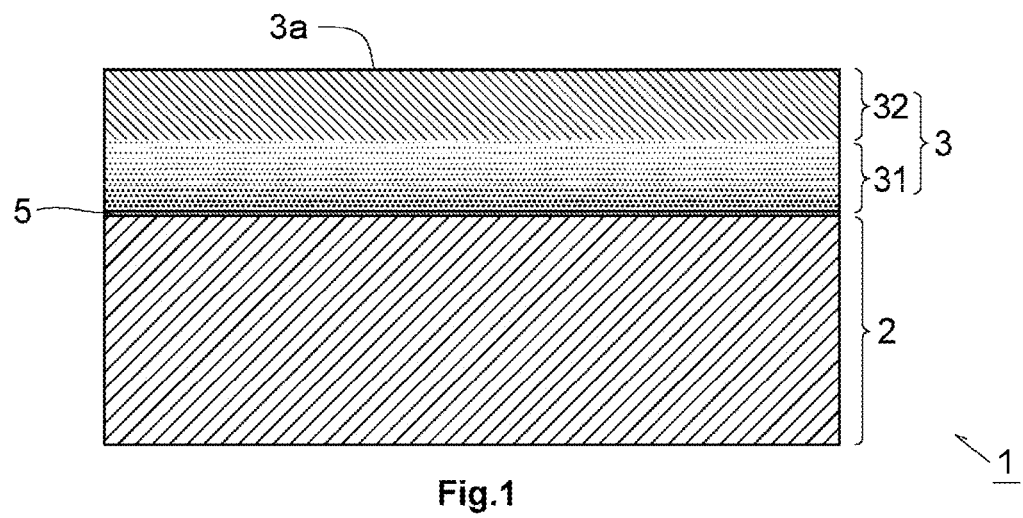
FIG. 1 is a cross-sectional view of a hard coat film according to one embodiment of the present invention.

FIG. 1 is a cross-sectional view of a hard coat film according to one embodiment of the present invention as cut in the thickness direction thereof.

Figure 2:
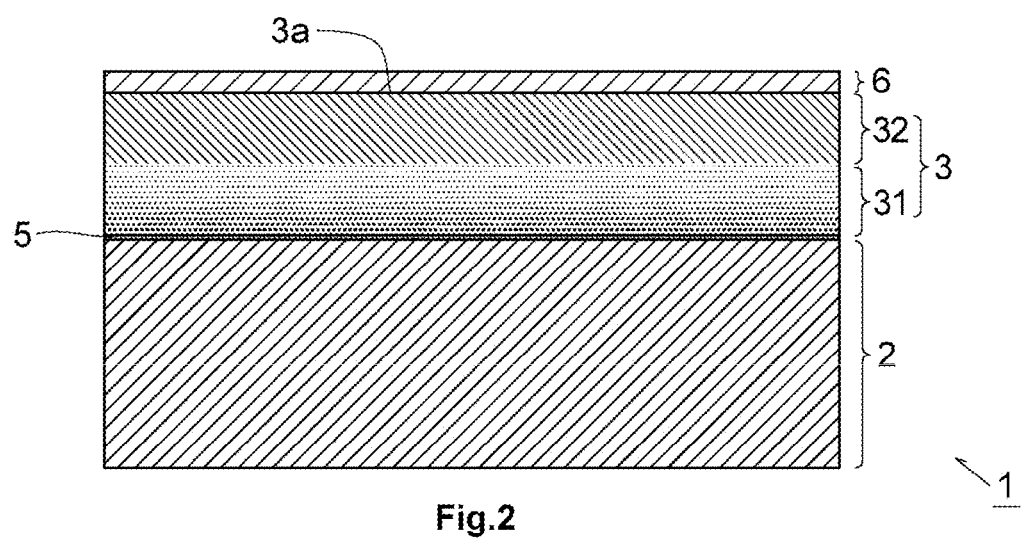
FIG. 2 is a cross-sectional view of a hard coat film according to another embodiment of the present invention.

FIG. 2 is a cross-sectional view of a hard coat film according to another embodiment of the present invention as cut in the thickness direction thereof.

However, it should be noted that the hard coat films, transparent films, and hard coat layers shown in the figures are different from actual ones in thickness or length.

In FIG. 1, the hard coat film 1 according to one embodiment includes a transparent film 2 and a hard coat layer 3 provided on the transparent film 2. An interface 5 exists between the transparent film 2 and the hard coat layer 3.

In FIG. 2, the hard coat film 1 according to another embodiment includes a transparent film 2, a hard coat layer 3 provided on the transparent film 2 and an antireflection layer 6 provided on the hard coat layer 3. An interface 5 exists between the transparent film 2 and the hard coat layer 3. The hard coat film 1 of FIG. 2 is the same as the hard coat film 1 of FIG. 1, except that the antireflection layer 6 is provided. Therefore, in FIG. 2, the same reference numerals as in FIG. 1 are given to the same components as in FIG. 1.

The interface 5 can be detected by a reflection spectrum analysis. In a region 31 from the interface 5 to a thickness-wise middle part of the hard coat layer 3, the refractive index continuously varies in the thickness direction of the hard coat film 1. Hereinafter, the region from the interface to the thickness-wise middle part of the hard coat layer may be sometimes referred to as a first region. It should be noted that the thickness-wise middle part of the hard coat layer 3 does not mean the thickness-wise central part between the interface 5 and the surface 3a of the hard coat layer 3.

The continuous variation of the refractive index in the first region 31 is achieved by the amount of the transparent film forming component decreasing toward the surface 3a of the hard coat layer 3.

As used herein, the surface of the hard coat layer refers to a surface on the side opposite from the lamination surface (interface) of the hard coat layer laminated on the transparent film.

Specifically, the hard coat film 1 is formed in a predetermined shape (e.g., rectangular shape in plan view, etc.). The thickness of the hard coat film is not particularly limited, but for example, 20 µm to 1000 µm and preferably 20 µm to 500 µm.

The intrinsic refractive index of the transparent film 2 and the intrinsic refractive index of the hard coat layer 3 are different. The intrinsic refractive index of the transparent film 2 may be smaller or larger than the intrinsic refractive index of the hard coat layer 3. For example, the intrinsic refractive index of the transparent film 2 is smaller than the intrinsic refractive index of the hard coat layer 3.

The intrinsic refractive index of the transparent film 2 refers to a refractive index measured for the transparent film alone (transparent film having no hard coat layer provided). The intrinsic refractive index of the hard coat layer 3 refers to a refractive index of the hard coat layer alone (the refractive index that the hard coat layer-forming component originally has).

The difference in refractive index between the transparent film 2 and the hard coat layer 3 is not particularly limited. In order to prevent the generation of interference fringes, theoretically, it is preferable that the difference in refractive index between the two is zero. However, it is practically difficult to select materials that allow the refractive index of the transparent film 2 and the refractive index of the hard coat layer 3 to be the same. The hard coat film 1 of the present invention is configured such that the refractive index continuously varies in the thickness direction in the first region 31 and also that no interface exists in the first region 31 (between the first region 31 and the below-mentioned region 32, there is no optical interface that can be detected by a reflection spectrum analysis). Therefore, the generation of interference fringes can be suppressed. Accordingly, in the present invention, it is also possible to use a transparent film 2 and a hard coat layer 3 having a relatively large difference in refractive index therebetween. Specifically, the difference in intrinsic refractive index between the transparent film 2 and the hard coat layer 3 is, for example, 0 to 0.20 and preferably 0.01 to 0.10. The difference in intrinsic refractive index between the two is a difference in refractive index between the transparent film-forming component and the hard coat layer-forming component (except for a transparent film-forming component contained in the hard coat layer).

The difference in refractive index between the transparent film 2 and the hard coat layer 3 is reduced by the presence of the first region 31 (and also the second region).

The refractive index refers to a value measured in accordance with JIS K 7142.

In the present invention, the interface 5 is a face that structurally separates the hard coat layer 3 from the transparent film 2. This interface 5 is an optical interface that can be detected by a reflection spectrum analysis. Only one interface 5 exists in the thickness direction of the hard coat film 1. That is, except for the one interface 5, no other optical interface that can be detected by a reflection spectrum analysis exists in the hard coat film 1. In other words, no interface that can be detected by a reflection spectrum analysis exists in the hard coat layer 3 and the transparent film 2.

The interface 5 can be detected by using a multi-channel photo detector (manufactured by Otsuka Electronics Co., Ltd., product name: "MCPD3700"). Specific method is used in accordance with the example below, [Method for Measuring Interface and the like].

The refractive index in the first region 31 continuously varies in the thickness direction of the hard coat film 1.

For example, in the case where the intrinsic refractive index of the transparent film 2 is smaller than the intrinsic refractive index of the hard coat layer 3, it is preferable that the refractive index in the first region 31 gradually increases toward the surface 3a of the hard coat layer 3. That is, based on the interface 5, in the direction from the interface 5 toward the surface 3a of the hard coat layer 3, the refractive index continuously varies to gradually approach the intrinsic refractive index of the hard coat layer 3.

Meanwhile, in the case where the intrinsic refractive index of the transparent film 2 is larger than the intrinsic refractive index of the hard coat layer 3, it is preferable that the refractive index in the first region 31 gradually decreases toward the surface 3a of the hard coat layer 3.

Although the hard coat film 1 shown in FIG. 1 has the hard coat layer 3 provided on one surface of the transparent film 1, it is also possible that the hard coat layers are provided on both surfaces of the transparent film (not shown).

The first region 31 is a mixed region where both the transparent film-forming component and the hard coat layer-forming component are present.

Hereinafter, the transparent film-forming component and the hard coat layer-forming component may be sometimes simply referred to as "film component" and "hard coat component", respectively.

The film component in the first region 31 decreases toward the surface 3a of the hard coat layer 3 without forming an interface that can be detected by the reflection spectrum analysis. The presence of the first region 31 provides excellent adhesion between the transparent film 2 and the hard coat layer 3. Therefore, even when the hard coat film 1 is used for a long period of time, the transparent film 2 and the hard coat layer 3 are unlikely to be separated from each other. The hard coat film 1 of the present invention has excellent durability. In addition, the difference in refractive index between the transparent film 2 and the hard coat layer 3 is reduced by the presence of the first region 31. Therefore, in the hard coat film 1 of the present invention, interference fringes due to the interface 5 between the transparent film 2 and the hard coat layer 3 are also suppressed.

The region 32 between the first region 31 and the surface 3a of the hard coat layer 3 is substantially made of a hard coat component. The presence of the region 32 on the surface side of the hard coat layer 3 makes it possible to provide a hard coat layer 3 with high hardness. However, a small amount of the film component may be contained in the region 32. Also between the first region 31 and the region 32, there is no optical interface that can be detected by a reflection spectrum analysis. That is, in the hard coat layer 3, the first region 31 and the region 32 are connected without forming an optical interface that can be detected by a reflection spectrum analysis.

In the transparent film 2, the hard coat component may be contained or no hard coat component may be contained. In the case where the hard coat component is contained in the transparent film 2, it is contained in the region from the interface 5 to a thickness-wise middle part of the transparent film 2. Hereinafter, the region from the interface to the thickness-wise middle part of the transparent film may be sometimes referred to as a second region. It should be noted that the thickness-wise middle part of the transparent film 2 does not mean the thickness-wise central part between the interface 5 and the rear surface of the transparent film 2.

The second region is a mixed region where both the transparent film-forming component and the hard coat layer-forming component are present. The film component in the second region gradually decreases toward the surface 3a of the hard coat layer 3 without forming an interface that can be detected by a reflection spectrum analysis. However, the thickness of the second region is smaller than the thickness of the first region 31.

Near the interface 5, a mixing ratio between the film component and the hard coat component is constant, or, alternatively, the film component slightly decreases toward the thickness direction.

(Transparent Film)

The transparent film is not particularly limited as long as it has excellent light transmittance at least for visible light and has excellent transparency. The transparent film has a light transmittance for visible light of preferably 80% or more, and more preferably 90% or more. However, the light transmittance refers to a Y-value obtained by color correction based on the spectrum data measured using a spectrophotometer (manufactured by Hitachi, Ltd., product name: "Model U-4100") at a film thickness of 100 µm.

A haze value of the transparent film is preferably 3% or less and, more preferably 1% or less. However, the haze value refers to a value measured in accordance with JIS-K7105.

Examples of the transparent film include plastic films formed from a transparent polymer. Examples of the transparent polymer include ester-based polymers such as polyethylene terephthalate and polyethylene naphthalate; cellulose-based polymers such as diacetyl cellulose and triacetyl cellulose; carbonate-based polymers; acrylic-based resins such as acrylic-based polymers such as polymethyl methacrylate, acrylic resins having an aromatic ring, and lactone-modified acrylic resins; styrene-based polymers such as polystyrene and acrylonitrile-styrene copolymers; olefin-based polymers such as polyethylene, polypropylene, polyolefin having a cyclic structure or a norbornene structure, and ethylene-propylene copolymers; vinyl chloride-based polymers; amide-based polymers such as aromatic polyamides; imide-based polymers; sulfone-based polymers; polyethersulfone-based polymers; polyetheretherketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blend polymers obtained by mixing them. As the transparent film, it is preferable to use a film formed from a formation material containing a cellulose-based polymer such as triacetyl cellulose or an acrylic-based resin film, and it is more preferable to use the cellulose-based polymer film.

As mentioned later, the hard coat film of the present invention can be laminated and attached to an optical film such as a polarizing plate and thus used in the form of a hard coat laminate. When a polarizer, for example, is used as the transparent film, a hard coat polarizing plate having a hard coat layer directly provided on the polarizer (a hard coat film having a polarizing function) can be formed. Similarly, when a retardation film, for example, is used as the transparent film, a hard coat retardation film having a hard coat layer directly provided on the retardation film (a hard coat film having an optical compensation function) can be formed. In addition, when a protection film, for example, is used as the transparent film, a hard coat protection film having a hard coat layer directly provided on the protection film (a hard coat film to serve also as a protection film) can be formed. Such a hard coat protection film can be laminated on one or both surfaces of a polarizer to form a hard coat polarizing plate. In this case, as the transparent film used for the hard coat protection film, it is preferable to use a film containing triacetyl cellulose, polycarbonate, acrylic-based polymers and olefin-based polymers having a cyclic structure or a norbornene structure as a main component.

The thickness of the transparent film is suitably set. In terms of strength, working properties such as handleability, thin layer properties, etc., the transparent film has a thickness of usually about 10 µm to about 500 µm, preferably 20 µm to 300 µm, and more preferably 30 µm to 200 µm.

The intrinsic refractive index of the transparent film is not particularly limited, but is usually 1.30 to 1.80, and preferably 1.40 to 1.70.

As the transparent film, a film having a retardation value suitable according to the use may be used.

(Hard Coat Layer)

The hard coat layer is a layer having a hardness of H or more as measured by a pencil hardness test.

However, the hardness refers to a value measured in accordance with the pencil hardness test of JIS K 5400.

The thickness of the hard coat layer is not particularly limited, but is usually 1 µm to 30 µm, preferably 2 µm to 20 µm, and more preferably 3 µm to 15 µm.

Generally, in the case where a hard coat layer having a high hardness of 3H or more is to be formed, the layer is sometimes designed to have a thickness of more than 15 µm. In a hard coat layer having a thickness of more than 15 µm, the generation of interference fringes tends to be suppressed. Accordingly, in the case where a hard coat layer having a thickness of 15 µm or less is to be formed, the suppression effect on interference fringes is prominent by employing the structure of the present invention. In particular, in the case of a hard coat layer having a hardness of 2H, the suppression effect on interference fringes of the present invention is prominent when its thickness is adjusted to 3 µm to 15 µm.

The hard coat layer is formed of a thin film obtained by applying a hard coat layer-forming material including a solvent and a curable compound onto the transparent film, followed by curing. It is preferable that the solvent contains a good solvent for the transparent film, and the curable compound contains a compound with a molecular weight of 800 or less.

In the present specification, a good solvent refers to a solvent that has a function to dissolve a transparent film, while a poor solvent refers to a solvent that does not have a function to dissolve a transparent film.

In the present specification, compounds with a molecular weight of 800 or less of all the curable compounds are referred to as "a low molecular-weight component with a molecular weight of 800 or less", or simply as "a low molecular-weight component".

In the present invention, a solvent that can dissolve the curable compound and the transparent film is used.

Examples of the solvent include alcohols such as methanol, ethanol, isopropyl alcohol, butanol, and 2-methoxyethanol; ketones such as acetone, methyl ethyl ketone, and methyl isobutyl; esters such as methyl acetate, ethyl acetate, and butyl acetate; ethers such as diisopropyl ether and propylene glycol monomethyl ether; glycols such as ethylene glycol and propylene glycol; cellosolves such as ethyl cellosolve and butyl cellosolve; aliphatic hydrocarbons such as hexane, heptane, octane, and cyclopentanone; and aromatic hydrocarbons such as benzene, toluene, and xylene. These solvents may be used alone or two or more thereof may be used in combination.

For example, in the case where the transparent film is a triacetyl cellulose film, examples of the good solvent therefor include acetone, methyl ethyl ketone, cyclopentanone, ethyl acetate, methyl acetate. In the case where the transparent film is a triacetyl cellulose film, examples of the poor solvent therefor include alcohols such as isopropyl alcohol, butanol, and ethanol, and ethers such as butyl acetate and propylene glycol monomethyl ether.

For example, in the case where the transparent film is an acrylic-based film, examples of the good solvent therefor include ethers such as cyclopentanone, methyl ethyl ketone, methyl isobutyl ketone, butyl acetate, ethyl acetate, diacetone alcohol, and tetrahydrofuran. In the case where the transparent film is an acrylic-based film, examples of the poor solvent therefor include alcohols such as isopropyl alcohol, butanol and ethanol and aromatic hydrocarbons such as xylene.

As the solvent, it is preferable to use the good solvent alone or a mixed solvent obtained by mixing the good solvent and the poor solvent. The good solvent and poor solvent can be suitably selected according to the material for the transparent film.

When the hard coat layer-forming material is applied onto the transparent film, the solvent penetrates into the transparent film, while the penetration of the solvent causes the elution and diffusion of a film component (e.g., a transparent film-forming polymer such as triacetyl cellulose, etc.). As a result, a mixed region where both the film component and the hard coat component (curable compound, etc.) are present is formed on the transparent film. The curing of the hard coat component leads to, in the mixed region, the formation of a region where the film component decreases in the direction away from the transparent film while retaining one interface that can be detected by a reflection spectrum analysis. The first region mentioned above, which is structured such that the film component decreases in the thickness direction while retaining one interface, does not have a new additional interface. Therefore, the hard coat layer of the present invention is presumed that the refractive index in the first region continuously varies in the thickness direction while retaining one interface that can be detected by a reflection spectrum analysis. It is considered that the solvent evaporation rate also relates to the penetration and diffusion.

In particular, the solvent containing the good solvent penetrates into the transparent film and swells the film to make a film component to easily elute. In addition, with respect to the curable compound containing the low molecular-weight component, the low molecular-weight component is easily mixed into the film component, and also the film component is easily diffused. Therefore, when a hard coat layer-forming material including the solvent containing the good solvent and the curable compound containing the low molecular-weight component is used, while retaining the interface between the transparent film and the hard coat layer, the film component decreases toward the surface of the hard coat layer with reducing the refractive index difference between the transparent film and the hard coat layer and allowing no other interface to form. Such a hard coat film is capable of suppressing the generation of interference fringes.

It is preferable that the solvent is suitably selected considering the penetration rate at which the solvent penetrates into the transparent film and the diffusion rate at which the film component is diffused into the hard coat layer-forming material upon the application of the hard coat layer-forming material onto the transparent film, as well as the drying conditions for the solvent.

The penetration rate is affected by the amount of the good solvent (and the poor solvent) for the film component (e.g., a transparent film-forming polymer such as triacetyl cellulose, etc.). The diffusion rate is affected by the molecular weight of the film curable compound in the hard coat layer-forming material, the molecular weight of the film component in the transparent film, the amount of a plasticizer in the transparent film, etc. In particular, it is important that the content ratio of the good solvent and the content ratio of the low molecular-weight component in the hard coat layer-forming material, etc., are adjusted within suitable ranges.

The curable compound can be used without any particular limitation as long as it is capable of forming a film having sufficient strength and transparency. Examples of the curable compound include resin monomers or oligomers curable with heat, and resin monomers or oligomers curable with ionizing radiation. It is preferable to use an ionizing radiation-curable monomer or oligomer in terms of high processability and low likelihood of heat damage to the transparent film.

Examples of resin monomers or oligomers curable with heat include monomers or oligomers such as acryl, polycarbonate, polystyrene, etc. The resin curable with heat also includes a resin cured by evaporating a solvent with heat.

Examples of the ionizing radiation-curable resin monomer or oligomer usually include curable compounds that are cured by UV rays or electron beams. Examples of the ionizing radiation-curable resin monomer or oligomer include monomers or oligomers having a polymerizable unsaturated linking group, epoxy group, etc., in the molecule, such as a (meth)acrylate group ("(meth)acrylate" means acrylate or/and methacrylate) and a (meth)acryloyloxy group. Here, the oligomer includes a prepolymer.

Specific examples of the oligomer include acrylates such as urethane(meth)acrylate, polyester(meth)acrylate, and epoxy(meth)acrylate, silicone resins such as siloxane, unsaturated polyesters, and epoxy. Specific examples of the monomer include styrene-based monomers such as α-methyl styrene, methyl(meth)acrylate, (meth)acrylate-2-ethylhexyl, dipentaerythritol hexa(meth)acrylate, clip entaerythritol penta(meth)acrylate, trimethylol prop anetri(meth)acrylate, urethane(meth)acrylate, and polyol compounds having two or more thiol groups in the molecule.

The molecular weight of the curable compound forming the hard coat layer is not particularly limited, but for example, is within the range of 200 to 10000.

A photopolymerization initiator is usually added to the ionizing radiation-curable resin monomer or oligomer. Examples of the photopolymerization initiator include 2,2-dimethoxy-2-phenylacetophenone, acetophenone, benzophenone, xanthone, 3-methylacetophenone, 4-chlorobenzophenone, 4,4'-dlimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropan-1-one, and other thioxanthone-based compounds.

In addition, a composition for forming the hard coat layer may contain an additive. Examples of the additive include leveling agents such as fluorine-based and silicone-based leveling agents, fine particles, fillers, dispersants, plasticizers, UV absorbers, surfactants, antioxidants, and thixotropic agents.

(Antireflection Layer)

An antireflection layer is provided on the surface of the hard coat layer. The hard coat film of the present invention may or may not be provided with the antireflection layer.

By providing the antireflection layer, the reflection of light on the surface of the hard coat layer can be further reduced.

The antireflection layer utilizes the effect of light interference to allow the opposite phases of incident light and reflected light to cancel each other, thereby exhibiting an antireflection function. Generally, when the surface of the hard coat layer is subjected to a low reflection treatment (i.e., when the antireflection layer is formed), interference fringes are more visible on the surface of the hard coat layer. In this respect, in the hard coat film of the present invention, the generation of interference fringes, which is seen in the case where the hard coat layer is provided with the antireflection layer, can also be effectively suppressed. Therefore, the present invention is also effective as a hard coat film that can perform a low reflection treatment.

Examples of a material for forming the antireflection layer include resins having inorganic fine particles mixed therewith. Examples of the resin such as the same curable compounds as for the hard coat layer can be used.

Examples of the inorganic fine particles include silica, alumina, glass fine particles, and magnesium fluoride. The particle diameter of the inorganic fine particle is preferably 2 nm to 80 nm, and more preferably 5 nm to 50 nm.

The thickness of the antireflection layer is not particularly limited, but for example, about 0.01 μm to 1 μm.

<Method for Producing Hard Coat Layer>

A hard coat film of the present invention is obtained by applying a hard coat layer-forming material including a solvent and a curable compound onto the transparent film, followed by curing the hard coat layer-forming material.

(Coating Film-Forming Step)

As the transparent film, those mentioned above as examples can be suitably used.

Preferably, a transparent film made of cellulose-based polymers such as triacetyl cellulose is used.

The hard coat layer-forming material can be prepared by suitably mixing the solvent and the curable compound mentioned above as examples.

A solvent preferably contains a good solvent for the transparent film, and more preferably contains both the good solvent and the poor solvent for the transparent film.

In the case where the solvent contains the good solvent and the poor solvent, their mixing ratio is not particularly limited, but is preferably such that the content ratio (mass ratio) between the good solvent and the poor solvent is 1:9 to 99:1.

A curable compound preferably contains a low molecular-weight component with a molecular weight of 800 or less. In the case where a curable compound contains a component other than a low molecular-weight component with a molecular weight of 800 or less, the component is usually a compound with a molecular weight of more than 800 (a high molecular-weight component).

For example, it is possible to use a hard coat layer-forming material including a solvent containing cyclopentanone and a curable compound containing a low molecular-weight component having at least either group of an acrylate group and a methacrylate group.

It is preferable that in consideration of the coating film thickness, the low molecular-weight component and the good solvent included in the hard coat layer-forming material satisfy the relationships of the following formulae 1 and 2.

$Y \geq -4.274 \ln(X) + 11.311$  Formula 1:

$Y \leq -4.949 \ln(X) + 15.474$  Formula 2:

In the above formulae, the "Y" represents b×t and the "X" represents a×t. The "a" represents the content ratio of the low molecular-weight component based on the total amount of the curable compound (in terms of mass) taken as 1. That is, the "a"=mass of low molecular-weight component in hard coat layer-forming material/mass of curable compound in hard coat layer-forming material.

The "b" represents the content ratio of the good solvent based on the total amount of the hard coat layer-forming material (in terms of mass) taken as 1. That is, the "b"=mass of good solvent in hard coat layer-forming material/mass of hard coat layer-forming material.

The "t" represents the thickness of the coating film (μm).

The "ln" in the formulae 1 and 2 represents the natural logarithm.

By forming the hard coat layer using the hard coat layer-forming material that satisfies the formulae 1 and 2 simultaneously, it is possible to obtain the hard coat film of the present invention, that is, a hard coat film having an interface that can be detected by a reflection spectrum analysis between the transparent film and the hard coat layer, having an refractive index that continuously varies in the thickness direction in the first region, and having no interface that can be detected by a reflection spectrum analysis in the first region.

This is presumed to be attributable to the effects of the penetration and diffusion of the solvent that contains the good solvent and the curable compound that contains the low molecular-weight component into the transparent film.

When the amount of the good solvent and the amount of the low molecular-weight component are each too large or too small, it is not possible to obtain a hard coat film in which interference fringes are suppressed. The present inventors have conducted extensive research assuming that the amount of the good solvent and the amount of the low molecular-weight component may greatly affect the generation of interference fringes in the hard coat film, and found the use of the hard coat layer-forming material that satisfies the relationships of the formulae 1 and 2. By using such a hard coat layer-forming material, it is possible to obtain a hard coat film in which not only the generation of interference fringes attributable to the interface between the transparent film and the hard coat layer is suppressed, but also the generation of interference fringes attributable to the film component in the hard coat layer is suppressed. This is a subject matter that the present inventors have first discovered.

The "a" (the content ratio of the low molecular-weight component) is preferably 0.3 or more and 1 or less, and more preferably 0.4 or more and less than 1. The "b" (the content ratio of the good solvent) is preferably 0.05 or more and 0.5 or less and more preferably 0.05 or more and 0.4 or less.

The ratio of the solid (the curable compound and the additive) in the hard coat layer-forming material is not particularly limited, but preferably 30% by mass to 70% by mass, more preferably 35% by mass to 60% by mass, and particularly preferably 40% by mass to 60% by mass.

When the solvent content is too low, the dissolution of the transparent film is insufficient. Meanwhile, when the solvent content is too high, the solvent may penetrate into the transparent film too much, making the transparent film opaque, or two or more interfaces may occur.

The hard coat layer-forming material has a viscosity (25° C.) of preferably 1 to 700 MPa·s, and more preferably 2 to 500 MPa·s.

The hard coat layer-forming material may be applied onto the transparent film using a coater such as a comma coater or a die coater. In addition, the hard coat layer-forming material may also be applied onto the transparent film by casting, spin coating, or other techniques.

In the case where the transparent film is a long film, it is preferable that the hard coat layer-forming material is applied using a coater. The long transparent film wound around a roll is pulled out and fed in the length direction of the production line. In the course of feeding, the hard coat layer-forming material is applied to the transparent film to form a hard coat layer. The transparent film having formed thereon a hard coat layer is wound up around a roll again. According to such a technique in which the film is wound up from a roll to a roll, the hard coat layer can be continuously formed on the transparent film, resulting in excellent productivity.

A coating film can be formed on the transparent film by applying the hard coat layer-forming material onto the transparent film.

The thickness of the coating film is suitably set in consideration of the thickness of the hard coat layer to be formed. The thickness of the coating film is thicker than the hard coat layer to be formed, for example, 1 µm to 100 µm, and more preferably 4 µm to 40 µm. For example, in the case where the hard coat layer-forming material is applied to the long transparent film using a coater, the thickness of the coating film is adjusted according to the amount of the hard coat layer-forming material discharged and the feeding rate of the transparent film.

(Curing Step)

It is preferable that the coating film is dried (i.e., the solvent is evaporated) after the hard coat layer-forming material is applied and before the coating film is cured (before polymerizing the curable compound containing the low molecular-weight component). This is for allowing the solvent to penetrate into the transparent film while drying the coating film.

Drying temperature is not particularly limited, but for example, may be 30° C. to 100° C. Drying time is suitably set according to the kinds of the transparent film and the solvent, the thickness of the coating film, etc., but is usually 30 seconds to 5 minutes.

The coating film is cured after drying.

In the case where the curable compound is an ionizing radiation-curable resin monomer or oligomer, the coating film is cured by irradiating the coating film with an energy ray according to the kind of the resin monomer or oligomer. Examples of a device for energy ray irradiation include high-pressure mercury lamps, halogen lamps, xenon lamps, nitrogen lasers, electron ray accelerators, and radioactive element radiation sources. The irradiation dose of the energy ray is suitably set according to the kinds of the curable compound and the photopolymerization initiator, etc., and is, for example, about 50 to 5,000 mJ/cm$^2$ as the integrated light amount at a UV wavelength of 365 nm.

As mentioned above, when the hard coat layer-forming material is applied onto the transparent film, the good solvent swells the transparent film, whereby the low molecular-weight component can penetrate into the transparent film and also the film component can be diffused into the coating film. As a result, the mixed region where both the low molecular-weight component and the film component are present can be formed on the interface between the transparent film and the hard coat layer (inside the hard coat layer), and also the film component can decrease toward the surface of the coating film without forming an interface that can be detected by a reflection spectrum analysis in a thickness-wise middle part of the mixed region. By curing this coating film, the hard coat film of the present invention which does not have an interface that can be detected by a reflection spectrum analysis in the hard coat layer can be obtained.

(Antireflection Layer Forming Step)

The antireflection layer forming step is a step of forming an antireflection layer on the surface of the hard coat layer.

This step is performed as necessary.

As the antireflection layer-forming material, those mentioned above as examples can be used.

The antireflection layer-forming material is applied onto the surface of the hard coat layer, and the material is dried or cured, whereby a hard coat film including the transparent film, hard coat layer, and antireflection layer laminated in this order can be obtained.

<Use of Hard Coat Film>

The hard coat film can be used as a member to be provided in a part to be protected from abrasion. Typically, the hard coat film can be used as a protection member for the screen of an image display device such as a liquid crystal display, a surface protection member for a touch panel, a cover member for a measuring instrument, an optical lens, or the like. In the case where the hard coat film is used for the image display device, the hard coat film is attached to the screen of the image display device alone or attached to an optical film incorporated into the screen. In addition, by lamination to various optical films, the hard coat film can be incorporated into the image display device in the form of a hard coat laminate. The hard coat film of the present invention is particularly useful as a clear hard coat film for the front of a display, such as a liquid crystal display.

Examples of the optical film to which the hard coat film is laminated include polarizers, retardation films, brightness-improving films, and laminates thereof, polarizing plates having a protection film laminated to a polarizer; and elliptically polarizing plates having a protection film and a retardation film laminated to a polarizer.

Examples of the polarizer of the polarizing plate include hydrophilic polymer films dyed with a dichroic pigment.

The hard coat film and the optical film are usually attached together through a known pressure-sensitive adhesive or adhesive. Examples of the pressure-sensitive adhesive and adhesive include pressure-sensitive adhesives and adhesives containing, as a base polymer, an acrylic-based polymer, a silicone-based polymer, an ester-based polymer, an urethane-based polymer, an epoxy-based polymer, and a rubber-based polymer.

Examples of the image display device that incorporates the hard coat film of the present invention include liquid crystal displays (LCDs), plasma display panels (PDPs), an organic electroluminescence displays (ELDs), and CRT televisions.

EXAMPLES

Examples and Comparative Examples of the present invention are described as follows. However, the present invention is not limited to only these Examples below.

Here, "part" and "%" mean "part by mass" and "% by mass", respectively.

<Test Method>

[Method for Measuring Molecular Weight]

The UV-curable resin monomer used was prepared into a 0.1% THF solution and allowed to stand at room temperature for one day. Subsequently, the solution was filtered through a 0.45 µm membrane filter. The resulting filtrate was subjected to GPC measurement using high speed GPC manufactured by TOSOH CORPORATION (product name: "HLC-8120GPC") to measure the molecular weight of the UV-curable resin monomer.

(Measurement Conditions)

Column: Manufactured by TOSOH CORPORATION, G4000H$_{XL}$, +G2000H$_{XL}$+G1000H$_{XL}$ Column temperature: 40° C.

Eluent: THF

Flow rate: 0.8 mL/minute

Amount poured: 100 µL

Detector: Differential refractometer (RI)

Standard sample: Polystyrene

[Method for Measuring Refractive Indices]

Refractive indices were measured using an Abbe refractometer (manufactured by ATAGO CO., LTD., product name: "DR-A1") in accordance with JIS K 7142.

[Method for Measuring Interface and the Like]

With respect to each of the hard coat films of Examples and Comparative Examples, the reflection spectra were measured according to the following measurement methods to check the presence of an interface and the variation of refractive index.

A black acrylic sheet (manufactured by MITSUBISHI RAYON CO., LTD., thickness: 2.0 mm) was bonded to the rear surface of the transparent film of each hard coat film through a transparent acrylic-based pressure-sensitive adhesive having a thickness of about 20 μm. The reflection spectra of the surface of the hard coat layer of each hard coat film was measured under the following conditions using a multi-channel photo detector (manufactured by Otsuka Electronics Co., Ltd., product name: "MCPD3700").

(Measurement Conditions)
  Reference: AL
  Algorithm: FFT method
  Calculation wavelength: 450 nm to 950 nm
  Refractive index: Hard coat layer: 1.53, transparent film: 1.49
(Detector Conditions)
  Exposure time: 20 ms
  Lamp gain: Normal
  Number of integrations: 1
(FFT Method)
  Range of detected film-thickness values: 0.5 μm to 12.0 μm
  Number of data: 212
  Film-thickness resolution: 24 nm
  Ber function: Used

[Method for Observing Interference Fringe]

A black acrylic sheet (manufactured by MITSUBISHI RAYON CO., LTD., thickness: 2.0 mm) was bonded to the rear surface of the transparent film of the hard coat film of each Examples and Comparative Examples through a transparent, acrylic-based pressure-sensitive adhesive having a thickness of about 20 μm. Interference fringes on the surface of the hard coat film was observed in a dark room using a three-wavelength source.

The results of the observation of interference fringes were rated according to the following criteria.

AA: Almost no interference fringes were visually recognized.
A: Slight interference fringes were visually recognized.
B: Interference fringes were visually recognized.
C: Clear interference fringes were visually recognized.

[Adhesion Test]

The adhesion between the transparent film and the hard coat layer was measured by a square peel test in accordance with JIS K 5600.

[Surface Hardness Test]

The hard coat films of Examples and Comparative Examples were each attached onto a glass plate through a pressure-sensitive adhesive having a thickness of about 20 μm, and their pencil hardness was measured in accordance with the pencil hardness test of JIS K 5400 (load: 500 g).

[Method for Measuring Reflectance]

A black acrylic sheet (manufactured by MITSUBISHI RAYON CO., LTD., thickness: 2.0 mm) was bonded to the rear surface of the transparent film of each hard coat film through a transparent acrylic-based pressure-sensitive adhesive having a thickness of about 20 μm. The reflectance on the surface of the antireflection layer of the hard coat film was measured using a spectrophotometer (manufactured by Hitachi, Ltd., product name: "U-4000"). For reflectance, the spectral reflectance (mirror reflectance and diffuse reflectance) was measured using the spectrophotometer mentioned above, and the reflectance (luminous reflectance Y-value) was calculated under C light source/2-degree field.

[Observation of Film Cross-Section]

Both surfaces of the hard coat film were protected with an epoxy resin. For the observation of the cross-section of the film, a specimen prepared by ultrathin sectioning was observed using a transmission electron microscope (TEM) (manufactured by Hitachi, Ltd., product name: "H-7650") at an acceleration voltage of 100 kV, and a TEM photograph was taken.

Example 1

To a resin solution obtained by dissolving a UV-curable resin monomer or oligomer containing a urethane acrylate as a main component in butyl acetate (manufactured by DIC Corporation, trade name: "UNIDIC 17-806", solid concentration: 80%) were added 5 parts of a photopolymerization initiator (manufactured by Ciba Japan, product name: "IRGACURE906") and 0.03 part of a leveling agent (manufactured by DIC Corporation, product name: "GRANDIC PC4100") per 100 parts of the solid concentration of the solution. Subsequently, butyl acetate was added to the solution so that the solid concentration of the solution was 75%. Further, cyclopentanone (hereinafter referred to as "CPN") was added to the solution so that the solid concentration of the solution was 50%. A hard coat layer-forming material for forming a hard coat layer was thus prepared.

In the case where the total amount of the hard coat layer-forming material is taken as 1, the content ratio (mass ratio) of the good solvent (CPN) in the hard coat layer-forming material was 0.33.

The UV-curable resin monomer or oligomer contained in the hard coat layer-forming material is an aggregate of urethane acrylates having various molecular weights. In the case where the total amount of the UV-curable resin monomer or oligomer is taken as 1, the content ratio (mass ratio) of the low molecular-weight component (the UV-curable resin monomer or oligomer with a molecular weight of 800 or less) was 0.482.

Table 1 is a list of the composition of each of the hard coat layer-forming materials used in Examples and Comparative Examples and the thickness of each of the coating films of Examples and Comparative Examples. The "a" in Table 1 represents the content ratio of the low molecular-weight component and the "b" in Table 1 represents the content ratio of the good solvent (CPN). The "t" in Table 1 represents the thickness of the coating film (μm).

TABLE 1

| | Hard coat layer-forming material | | | | | | |
|---|---|---|---|---|---|---|---|
| | Solid concentration (%) | Solvent composition (mass ratio) | a | b | Coating film t (μm) | X | Y |
| Example 1 | 50 | CPN:PM = 100:0 | 0.482 | 0.33 | 13.8 | 6.7 | 4.6 |
| Example 2 | 50 | CPN:PM = 80:20 | 0.482 | 0.27 | 13.8 | 6.7 | 3.7 |

TABLE 1-continued

| | Hard coat layer-forming material | | | | | | |
|---|---|---|---|---|---|---|---|
| | Solid concentration (%) | Solvent composition (mass ratio) | a | b | Coating film t (μm) | X | Y |
| Example 3 | 50 | CPN:PM = 20:80 | 0.952 | 0.07 | 14.0 | 13.3 | 0.9 |
| Example 4 | 50 | CPN:PM = 100:0 | 0.564 | 0.33 | 13.8 | 7.8 | 4.6 |
| Example 5 | 50 | CPN:PM = 50:50 | 0.623 | 0.17 | 13.9 | 8.7 | 2.3 |
| Comparative Example 1 | 50 | CPN:PM = 60:40 | 0.482 | 0.20 | 13.9 | 6.7 | 2.8 |
| Comparative Example 2 | 50 | CPN:PM = 40:60 | 0.482 | 0.13 | 14.0 | 6.7 | 1.9 |
| Comparative Example 3 | 50 | CPN:PM = 20:80 | 0.482 | 0.07 | 14.0 | 6.7 | 0.9 |
| Comparative Example 4 | 50 | CPN:PM = 0:100 | 0.482 | 0.0 | 14.1 | 6.8 | 0.0 |
| Comparative Example 5 | 50 | CPN:PM = 0:100 | 0.952 | 0.0 | 14.1 | 13.4 | 0.0 |
| Comparative Example 6 | 50 | CPN:PM = 100:0 | 0.228 | 0.33 | 13.8 | 3.1 | 4.6 |
| Comparative Example 7 | 50 | CPN:PM = 100:0 | 0.300 | 0.33 | 13.8 | 4.1 | 4.6 |
| Comparative Example 8 | 50 | CPN:PM = 40:60 | 0.300 | 0.13 | 14.0 | 4.2 | 1.9 |
| Comparative Example 9 | 36 | CPN:IPA = 60:40 | 0.482 | 0.22 | 20.6 | 9.9 | 4.5 |
| Comparative Example 10 | 40 | CPN:IPA = 80:20 | 0.482 | 0.51 | 17.7 | 8.5 | 9.0 |

The coating film was formed by applying the hard coat layer-forming material on the transparent triacetyl cellulose film (manufactured by Fujifilm Corporation, product name: "TD80UL", thickness: 80 μm, refractive index: 1.49) using a the coater. The hard coat layer-forming material was applied 13.8 μm in thickness such that the thickness of the coating film after curing (hard coat layer) would be 7.5 μm. That is, it was applied such that the thickness of the coating film after curing (hard coat layer) would be 7.5 μm if the solvent does not penetrate into the film.

The coating film was dried at 80° C. for 2 minutes. Subsequently, the coating film was subjected to UV irradiation using a high-pressure mercury lamp at an integrated light amount of 300 mJ/cm$^2$ to polymerize the resin monomer. A hard coat layer-forming material on the triacetyl cellulose film was thus prepared.

The intrinsic refractive index of the hard coat layer was 1.53.

With respect to the hard coat film obtained, the presence of an interface and variation of refractive index were measured by [Method for Measuring Interface and the like], [Method for Observing Interference Fringe], [Adhesion Test] and [Surface Hardness Test] mentioned above. The results are shown in Table 2.

After these measurements, the following antireflection layer was formed.

The antireflection layer-forming material shown below was uniformly applied to the entire surface of the hard coat layer using a die coater. The coating film was heated at 90° C. for 2 minutes and cured by UV irradiation, thereby forming an antireflection layer having a thickness of 0.1 μm over the entire surface of the hard coat layer. The antireflection layer had a refractive index of 1.38.

The antireflection layer-forming material is prepared by diluting a low refraction material (manufactured by JSR Corporation, trade name: "JUA204", solid concentration: 9.5%) with a mixed solvent (MIBK:TBA=50:50) to adjust the solid concentration to 2.0%. The low refraction material is a UV-curable resin including a fluorine compound having an ethylenic unsaturated group, an acrylate, a polymerization initiator, and about 50% of hollow nano silica relative to the active ingredients.

The hard coat film after forming the antireflection layer was subjected to observation of the reflectance on the surface of the antireflection layer and the interference fringe seen from the surface of the antireflection layer in accordance with [Method for Measuring Reflectance] and [Method for Observing Interference Fringe] mentioned above. The results are shown in Table 2.

Example 2

A hard coat film was formed in the same manner as in Example 1, except that a mixed solvent of CPN and propylene glycol monomethyl ether (hereinafter, referred to as "PM") (CPN:PM(mass ratio)=4:1) was used in place of CPN. The hard coat film was subjected to the predetermined measurement. Further, the hard coat film after forming the antireflection layer was subjected to the predetermined measurement in the same manner as in Example 1. The results are shown in Table 2.

The content ratio of the low molecular-weight component in the hard coat layer-forming material and the content ratio of the good solvent, and the thickness of the coating film are as shown in Table 1. These content ratios of each Example and Comparative Example below are also as shown in Table 1.

Example 3

A hard coat film was formed in the same manner as in Example 1, except that a mixed solvent of CPN and PM (CPN:PM (mass ratio)=1:4) was used in place of CPN, and that a resin solution having dissolved therein a UV-curable resin monomer or oligomer containing pentaerythritol acrylate as a main component (manufactured by OSAKA ORGANIC CHEMICAL INDUSTRY LTD., trade name: "BISCOAT #300") was used. The hard coat film was subjected to the predetermined measurement. Further, the hard coat film after forming the antireflection layer was subjected to the predetermined measurement in the same manner as in Example 1.

Example 4

A hard coat film was formed in the same manner as in Example 1, except that a resin solution having dissolved therein a UV-curable resin monomer or oligomer containing pentaerythritol acrylate as a main component (manufactured by SHIN-NAKAMURA CHEMICAL CO., LTD, trade name: "A-DPH") was used. The hard coat film was subjected to the predetermined measurement. Further, the hard coat film after forming the antireflection layer was subjected to the predetermined measurement in the same manner as in Example 1.

Example 5

A hard coat film was formed in the same manner as in Example 1, except that a mixture of the above resin solution (manufactured by DIC Corporation, trade name: "UNIDIC 17-806") and the above resin solution (manufactured by OSAKA ORGANIC CHEMICAL INDUSTRY LTD., trade name: "BISCOAT #300") at a mass ratio of 7:3 was used as a resin solution. The hard coat film was subjected to the predetermined measurement. Further, the hard coat film after forming the antireflection layer was subjected to the predetermined measurement in the same manner as in Example 1.

Comparative Example 1

A hard coat film was formed in the same manner as in Example 1, except that a mixed solvent of CPN and PM (CPN:PM (mass ratio)=3:2) was used in place of CPN. The hard coat film was subjected to the predetermined measurement. Further, the hard coat film after forming the antireflection layer was subjected to the predetermined measurement in the same manner as in Example 1.

Comparative Example 2

A hard coat film was formed in the same manner as in Example 1, except that a mixed solvent of CPN and PM (CPN:PM (mass ratio)=2:3) was used in place of CPN. The hard coat film was subjected to the predetermined measurement. Further, the hard coat film after forming the antireflection layer was subjected to the predetermined measurement in the same manner as in Example 1.

Comparative Example 3

A hard coat film was formed in the same manner as in Example 1, except that a mixed solvent of CPN and PM (CPN:PM (mass ratio)=1:4) was used in place of CPN. The hard coat film was subjected to the predetermined measurement. Further, the hard coat film after forming the antireflection layer was subjected to the predetermined measurement in the same manner as in Example 1.

Comparative Example 4

A hard coat film was formed in the same manner as in Example 1, except that only PM was used in place of CPN. The hard coat film was subjected to the predetermined measurement. Further, the hard coat film after forming the anti-reflection layer was subjected to the predetermined measurement in the same manner as in Example 1.

However, in Comparative Example 4, the adhesion between the transparent film and the hard coat layer was poor (see the results of the adhesion test), and thus no hardness test was performed.

Comparative Example 5

A hard coat film was formed in the same manner as in Example 1, except that only PM was used and a resin solution having dissolved therein a UV-curable resin monomer or oligomer including pentaerythritol acrylate as a main component (manufactured by OSAKA ORGANIC CHEMICAL INDUSTRY LTD., trade name: "BISCOAT #300") was used. The hard coat film was subjected to the predetermined measurement. Further, the hard coat film after forming the anti-reflection layer was subjected to the predetermined measurement in the same manner as in Example 1.

Comparative Example 6

A hard coat film was formed in the same manner as in Example 1, except that a resin solution having dissolved therein a UV-curable resin monomer or oligomer containing a multifunctional urethane acrylate as a main component (manufactured by THE NIPPON SYNTHETIC CHEMICAL INDUSTORY CO., LTD., trade name: "UV7610B") was used as a resin solution. The hard coat film was subjected to the predetermined measurement. Further, the hard coat film after forming the antireflection layer was subjected to the predetermined measurement in the same manner as in Example 1.

However, in Comparative Example 6, the adhesion between the transparent film and the hard coat layer was poor (see the results of the adhesion test), and thus no hardness test was performed.

Comparative Example 7

A hard coat film was formed in the same manner as in Example 1, except that a mixture of the above resin solution (manufactured by THE NIPPON SYNTHETIC CHEMICAL INDUSTORY CO., LTD., trade name: "UV7610B") and the above resin solution (manufactured by OSAKA ORGANIC CHEMICAL INDUSTRY LTD., trade name: "BISCOAT #300") at a mass ratio of 9:1 was used as a resin solution. The hard coat film was subjected to the predetermined measurement. Further, the hard coat film after forming the antireflection layer was subjected to the predetermined measurement in the same manner as in Example 1.

Comparative Example 8

A hard coat film was formed in the same manner as in Example 1, except that a mixed solvent of CPN and PM (CPN:PM (mass ratio)=2:3) was used in place of CPN and a mixture of the above resin solution (manufactured by THE NIPPON SYNTHETIC CHEMICAL INDUSTORY CO., LTD., trade name: "UV7610B") and the above resin solution (manufactured by OSAKA ORGANIC CHEMICAL INDUSTRY LTD., trade name: "BISCOAT #300") at a mass ratio of 9:1 was used as a resin solution. The hard coat film was subjected to the predetermined measurement. Further, the hard coat film after forming the antireflection layer was subjected to the predetermined measurement in the same manner as in Example 1.

Comparative Example 9

A hard coat film was formed in the same manner as in Example 1, except that a mixed solvent of CPN and isopropyl alcohol (CPN:IPA (mass ratio)=3:2) was used in place of CPN, and that the mixed solution was added so that the solid concentration of the hard coat layer-forming material was 36%. The hard coat film was subjected to the predetermined measurement. Further, the hard coat film after forming the antireflection layer was subjected to the predetermined measurement in the same manner as in Example 1.

Comparative Example 10

A hard coat film was formed in the same manner as in Example 1, except that a mixed solvent of CPN and isopropyl alcohol (CPN:IPA (mass ratio)=4:1) was used in place of CPN, and that the mixed solution was added so that the solid concentration of the hard coat layer-forming material was 40%. The hard coat film was subjected to the predetermined measurement. Further, the hard coat film after forming the antireflection layer was subjected to the predetermined measurement in the same manner as in Example 1.

tive index continuously varies from the interface corresponding to the peak toward the surface of the hard coat layer. Meanwhile, it can be said that in the case where the value of the peak intensity is large, the variation of refractive index is significant (the variation of refractive index indicates a sudden change) and the variation of refractive index is not continuous.

Specifically, with respect to the FFT peak 2 in Table 2, it is shown that in Examples 1 to 5 where the intensity is not more than half the intensity 55 of Comparative Example 4 (mode where the transparent film is hardly swelled), the refractive index continuously varies from the interface toward the surface of the hard coat layer.

The results of the reflection spectrum measurement (see Table 2 and the graphs) show that in each of the hard coat films of Examples 1 to 5, the component forming a transparent film is gradually decreasing from near a film thickness of 6.5 μm toward the hard coat layer side. Further, in Examples 1 to 5, a FFT peak with an intensity of about 15 appeared near a film thickness of 6.5 μm, and no FFT peak was seen in any other parts. This shows that in each of the hard coat films of Examples 1 to 5, one interface exists between the transparent film and the hard coat layer, and no other interface exists.

TABLE 2

Figure 11A:
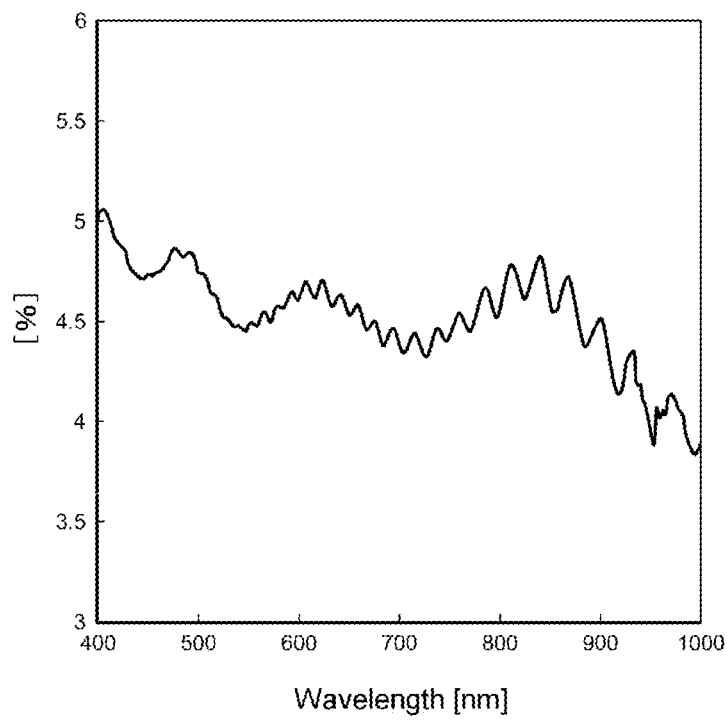
FIGS. 11(a) and 11(b) are graphs showing the results of the reflection spectrum measurement in Comparative Example 9.
Figure 11B:
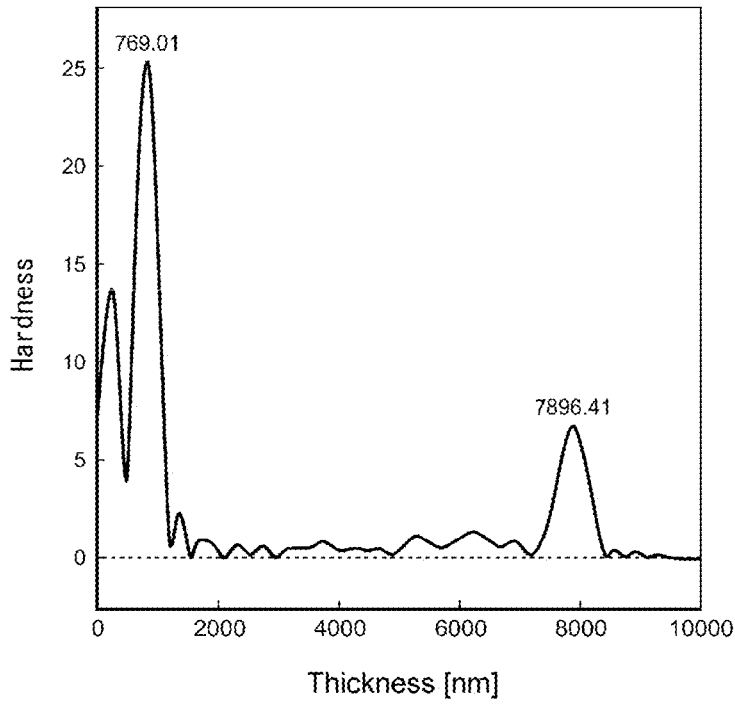

| | | FFT peak 1 | | FFT peak 2 | | | | | Antireflection layer | |
| | Cross-sectional photograph | Film thickness (μm) | Intensity | Film thickness (μm) | Intensity | Interference fringes | Adhesion | Hardness | Reflectance (%) | Interference fringes |
|---|---|---|---|---|---|---|---|---|---|---|
| Example 1 | FIG. 11 | — | — | 6.6 | 15 | AA | 0/100 | 2H | 1.25 | AA |
| Example 2 | FIG. 11 | — | — | 6.5 | 16 | AA | 0/100 | 2H | 1.25 | AA |
| Example 3 | — | — | — | 6.7 | 13 | AA | 0/100 | 2H | 1.25 | AA |
| Example 4 | — | — | — | 6.7 | 17 | AA | 0/100 | 2H | 1.25 | AA |
| Example 5 | — | — | — | 6.3 | 14 | AA | 0/100 | 2H | 1.25 | AA |
| Comparative Example 1 | FIG. 11 | 5.1 | 17 | 6.7 | 12 | A | 0/100 | 2H | 1.25 | B |
| Comparative Example 2 | FIG. 11 | 5.6 | 30 | 6.6 | 8 | A | 0/100 | 2H | 1.25 | B |
| Comparative Example 3 | FIG. 11 | — | — | 5.8 | 38 | B | 0/100 | 2H | 1.25 | C |
| Comparative Example 4 | FIG. 11 | — | — | 6.0 | 55 | C | 80/100 | — | 1.25 | D |
| Comparative Example 5 | — | 5.6 | 31 | 6.4 | 42 | B | 0/100 | 2H | 1.25 | C |
| Comparative Example 6 | — | — | — | 5.7 | 44 | C | 100/100 | — | 1.25 | D |
| Comparative Example 7 | — | 4.3 | 28 | 6.9 | 40 | B | 0/100 | 2H | 1.25 | C |
| Comparative Example 8 | — | 5.0 | 22 | 6.6 | 27 | B | 0/100 | 2H | 1.25 | C |
| Comparative Example 9 | FIG. 11 | 0.8 | 25 | 7.9 | 7 | B | 0/100 | H | 1.25 | C |
| Comparative Example 10 | — | 1.2 | 22 | 7.3 | 11 | B | 0/100 | H | 1.25 | C |

FFT peak 1 and FFT peak 2 in Table 2 represent a peak intensity of a reflection spectrum. The film thickness in Table 2 represents the distance from the surface of the hard coat layer to the part where an intense peak is observed.

Figure 3A:
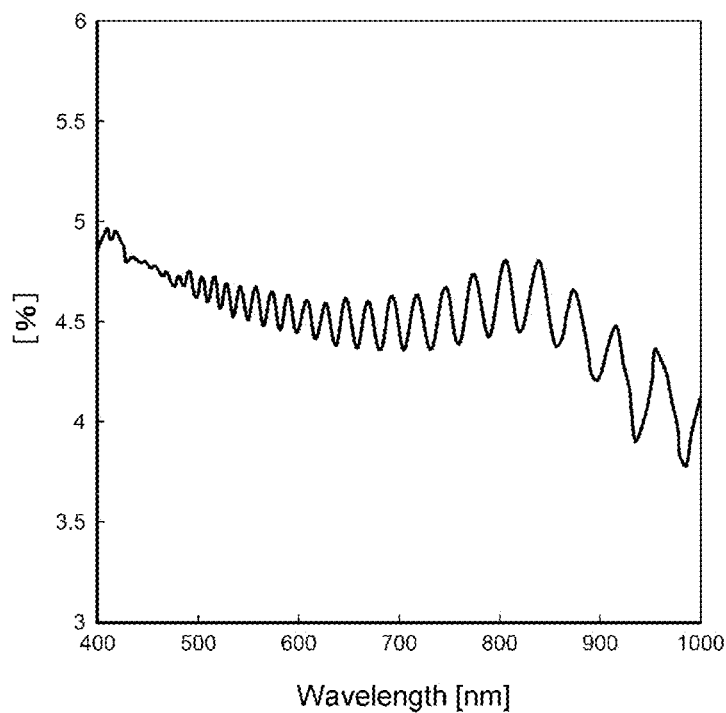
FIGS. 3(a) and 3(b) are graphs showing the results of the reflection spectrum measurement in Example 1.
Figure 3B:
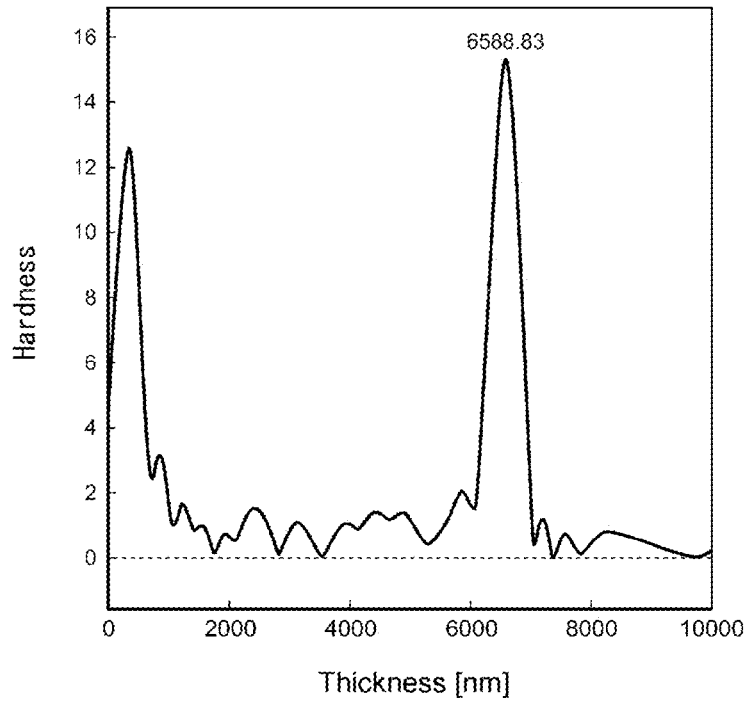
Figure 4A:
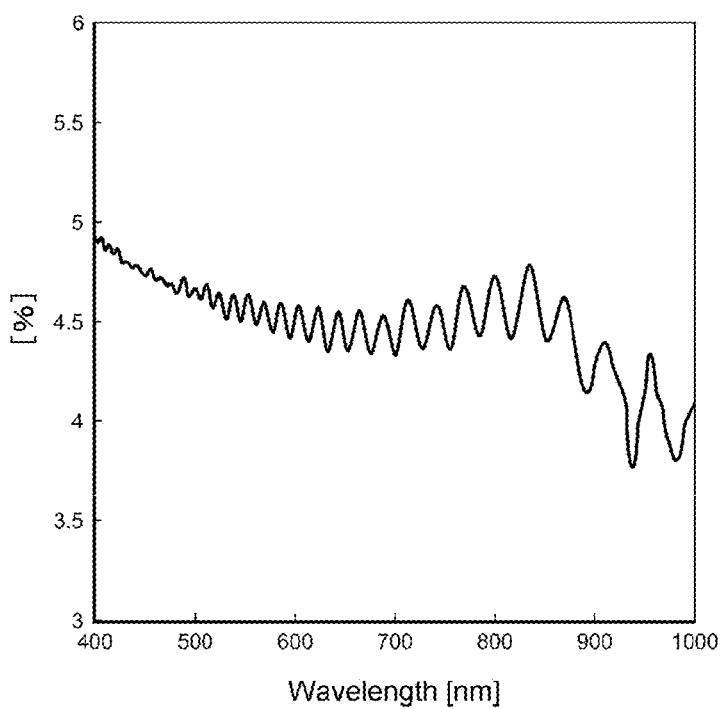
FIGS. 4(a) and 4(b) are graphs showing the results of the reflection spectrum measurement in Example 2.
Figure 4B:
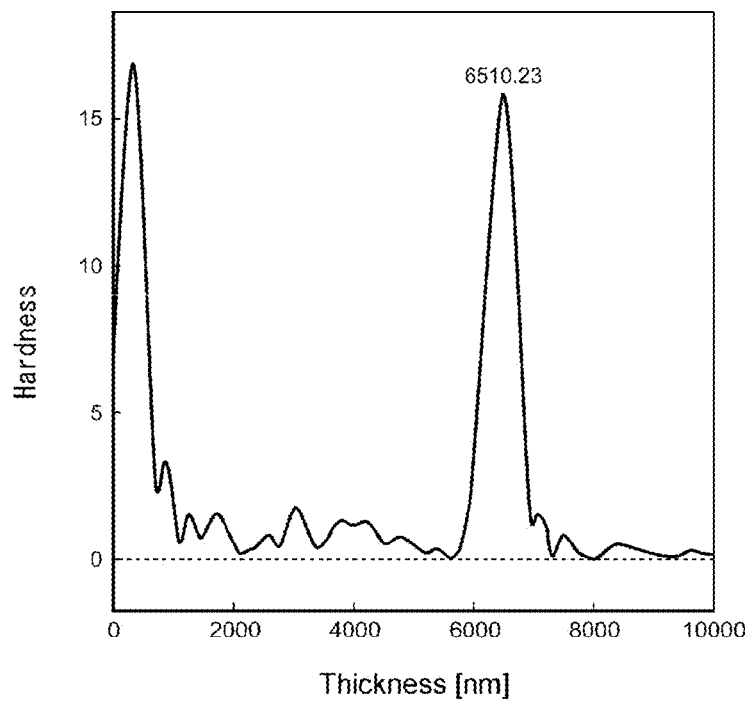
Figure 5A:
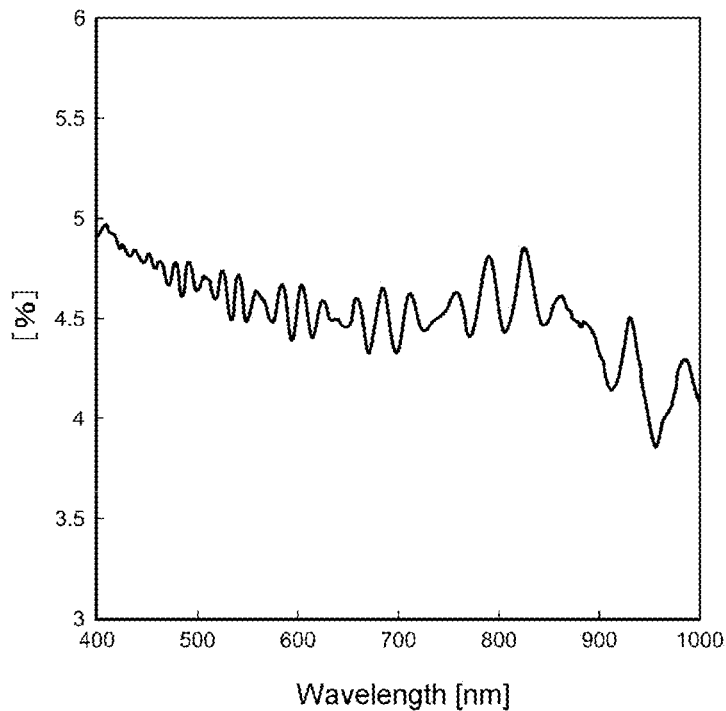
FIGS. 5(a) and 5(b) are graphs showing the results of the reflection spectrum measurement in Comparative Example 1.
Figure 5B:
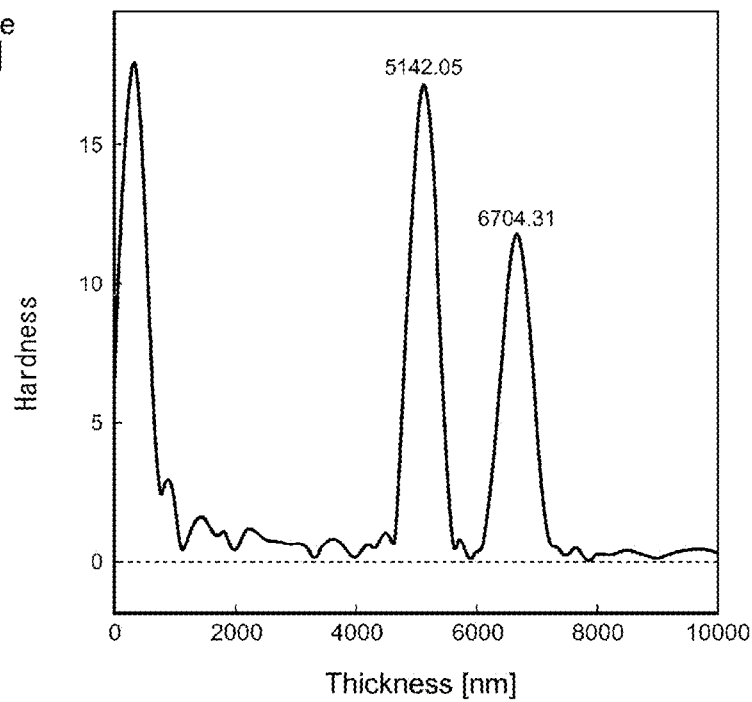
Figure 6A:
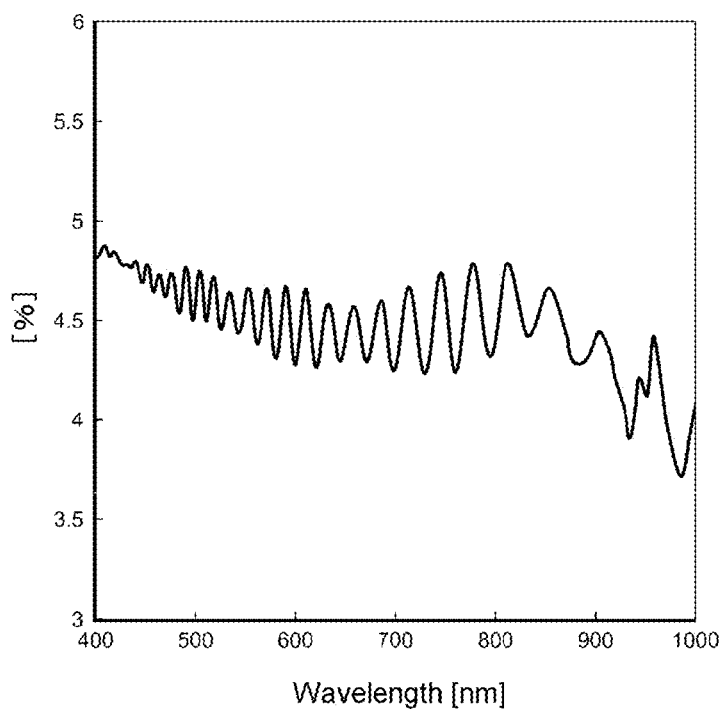
FIGS. 6(a) and 6(b) are graphs showing the results of the reflection spectrum measurement in Comparative Example 2.
Figure 6B:
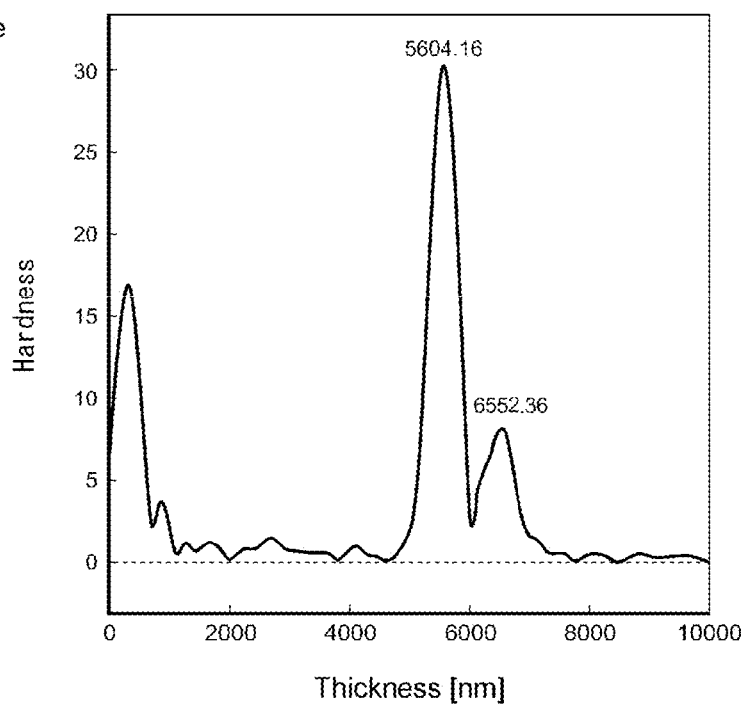
Figure 7A:
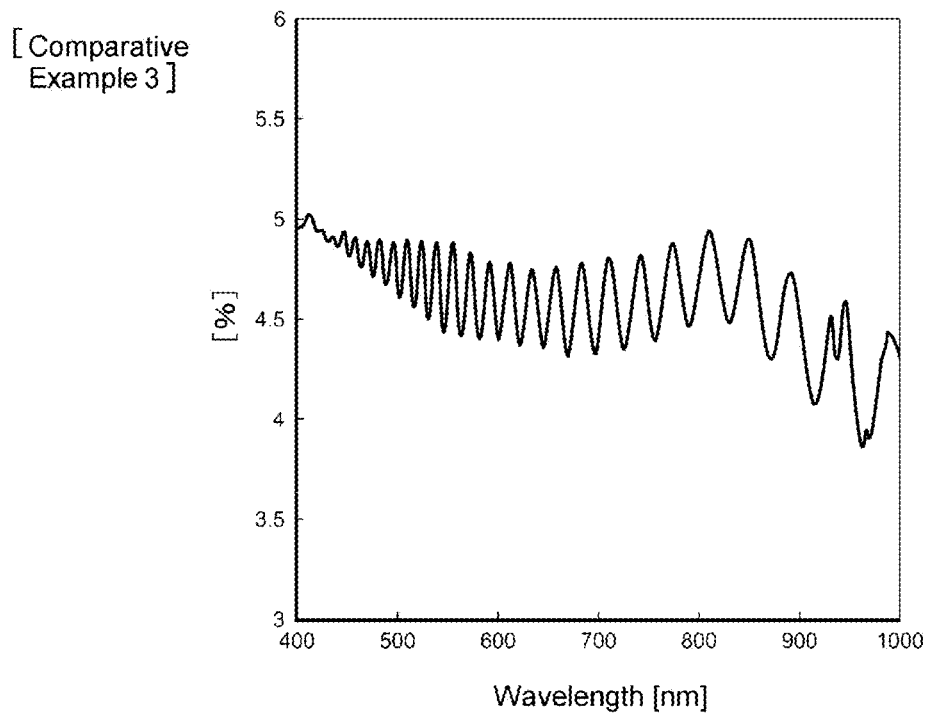
FIGS. 7(a) and 7(b) are graphs showing the results of the reflection spectrum measurement in Comparative Example 3.
Figure 7B:
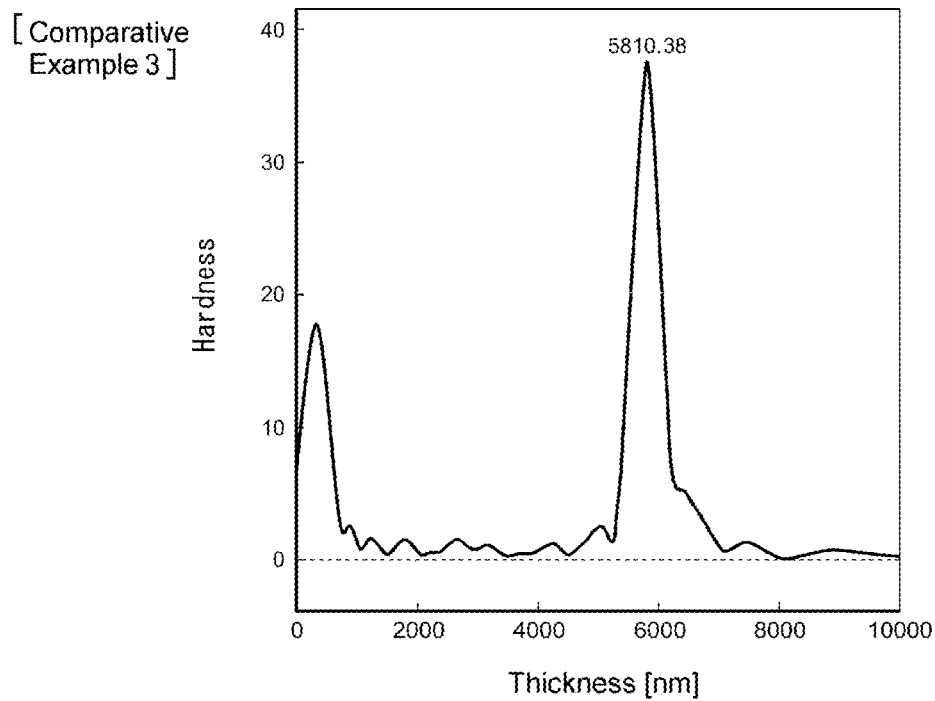
Figure 8A:
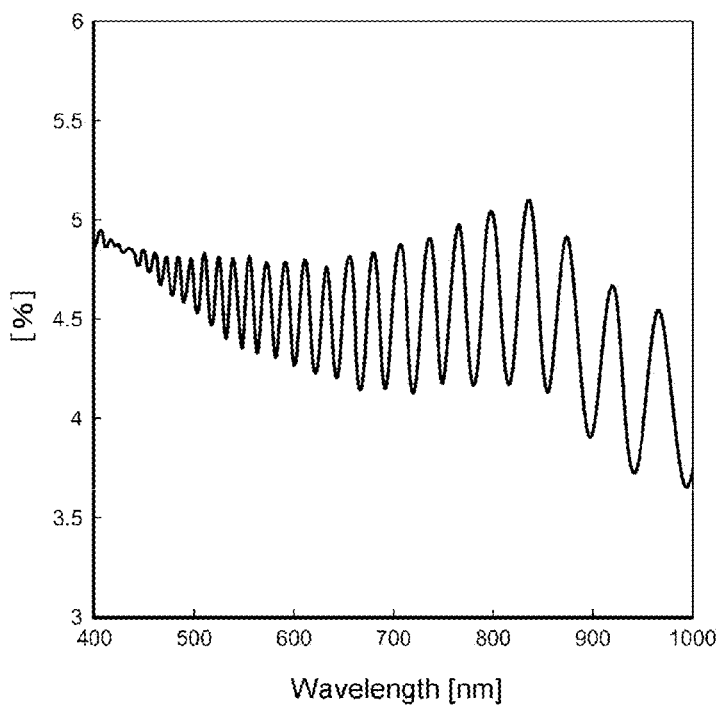
FIGS. 8(a) and 8(b) are graphs showing the results of the reflection spectrum measurement in Comparative Example 4.
Figure 8B:
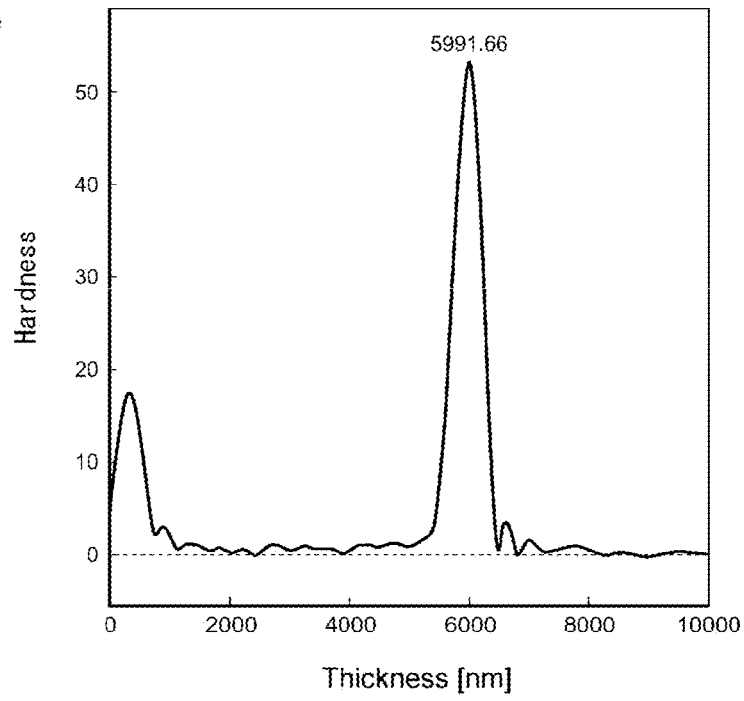
Figure 9A:
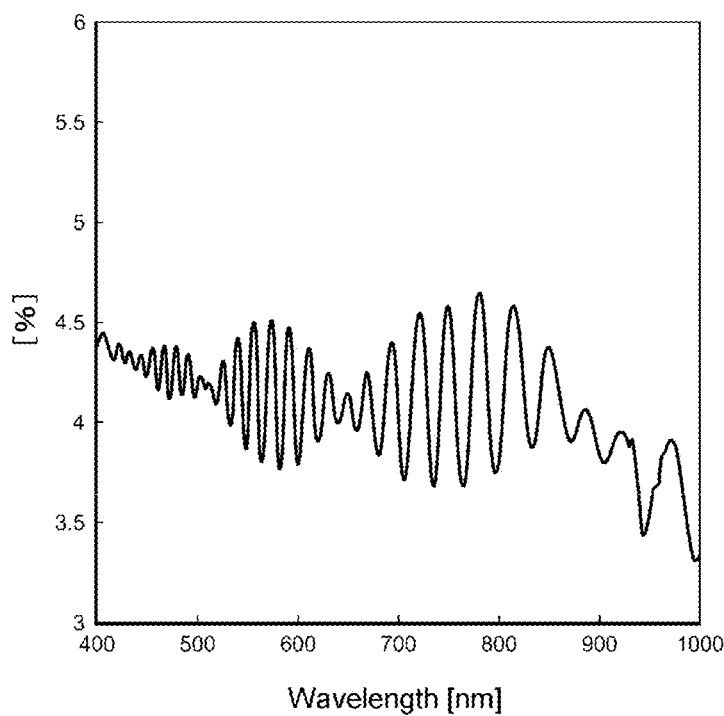
FIGS. 9(a) and 9(b) are graphs showing the results of the reflection spectrum measurement in Comparative Example 5.
Figure 9B:
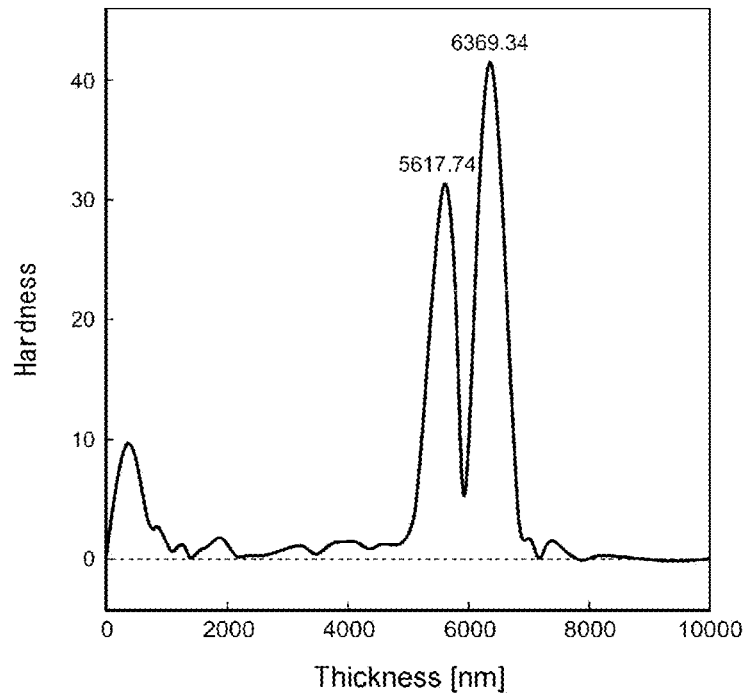
Figure 10A:
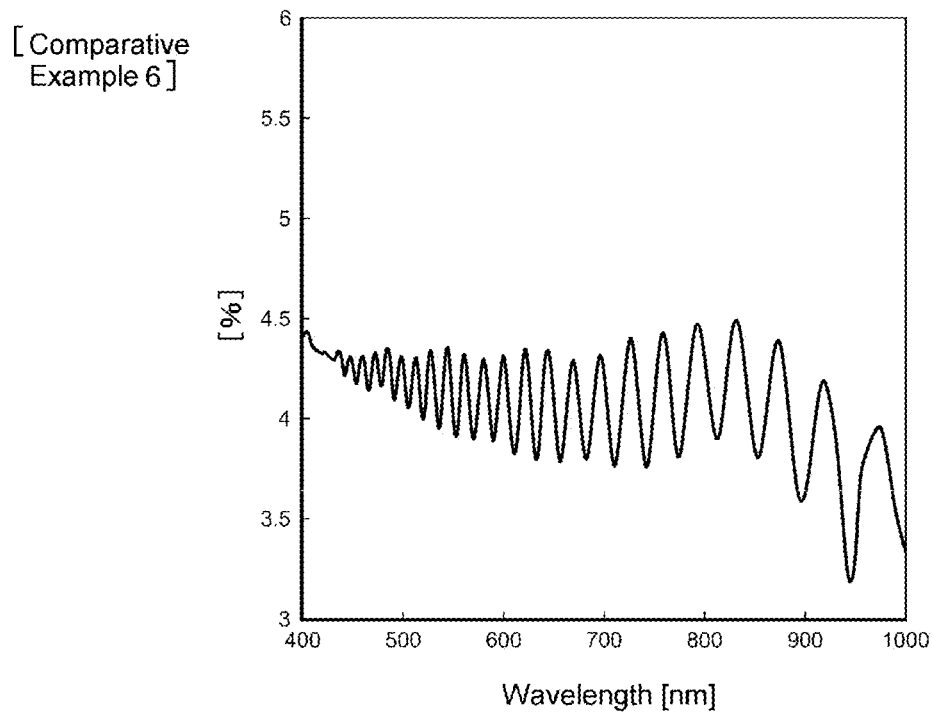
FIGS. 10(a) and 10(b) are graphs showing the results of the reflection spectrum measurement in Comparative Example 6.
Figure 10B:
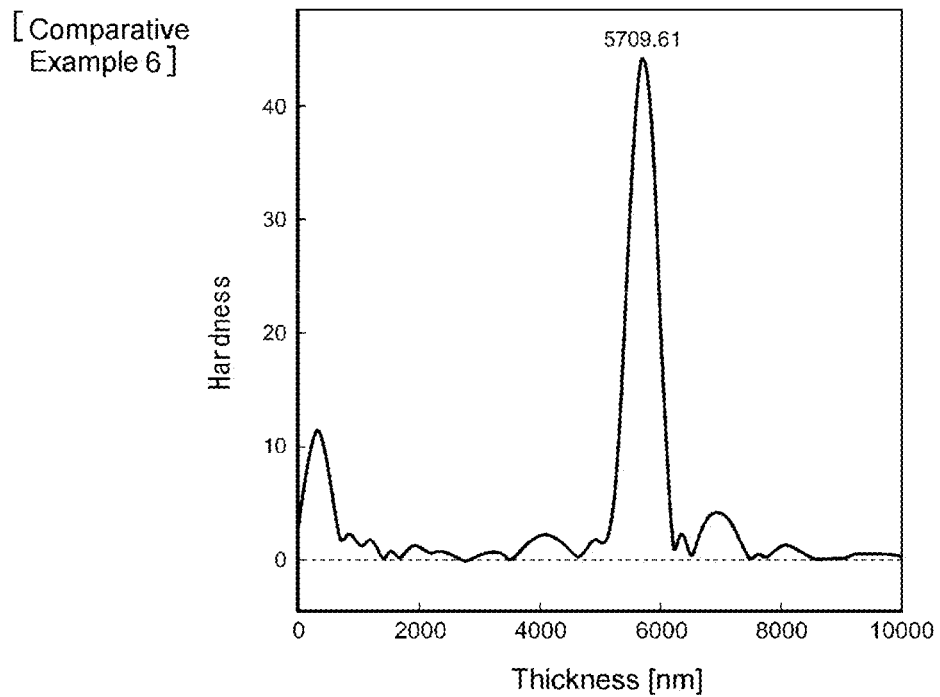

Also, FIG. 3 and FIG. 4 represent the graphs for the results of the reflection spectrum measurement of Examples 1 and 2, FIG. 5 to FIG. 10 represent the graphs for the results of the reflection spectrum measurement of Comparative Examples 1 to 6, and FIG. 11 represents the graph for the results of the reflection spectrum measurement of Comparative Example 9.

It can be said that the results of the reflection spectrum measurement show that the interface exists in the part where an intense peak was seen. In addition, it can be said that in the case where the value of the peak intensity is small, the refrac- The results of the reflection spectrum measurement (see Table 2 and the graphs) show that in each of the hard coat films of Comparative Examples 1, 2, 5, 7, and 8, interfaces exist at a film thickness of 4.3 μm to 5.6 μm and also at a film thickness of 6.4 μm to 6.9 μm, respectively (i.e., interfaces exist in two places), and the refractive index varies near such two interfaces.

Figure 12:
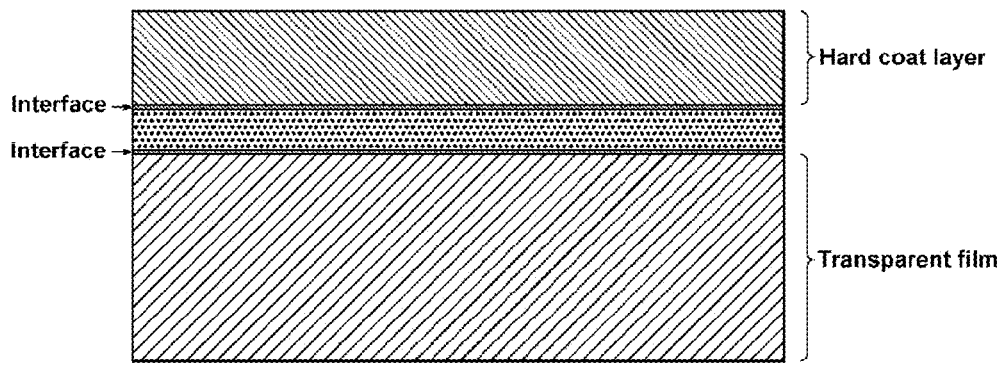
FIG. 12 is a reference cross-sectional view schematically showing each of the hard coat films of Comparative Examples 1, 2, 5, 7, and 8.

FIG. 12 is a reference cross-sectional view schematically showing each of these hard coat films.

The results of the reflection spectrum measurement (see Table 2 and the graphs) show that in each of the hard coat films of Comparative Examples 3, 4, and 6, one interface exists at a film thickness of 5.7 μm to 6 μm. However, these hard coat films have a high peak intensity (38 to 55), indicating a sudden change in the refractive index.

Figure 13:
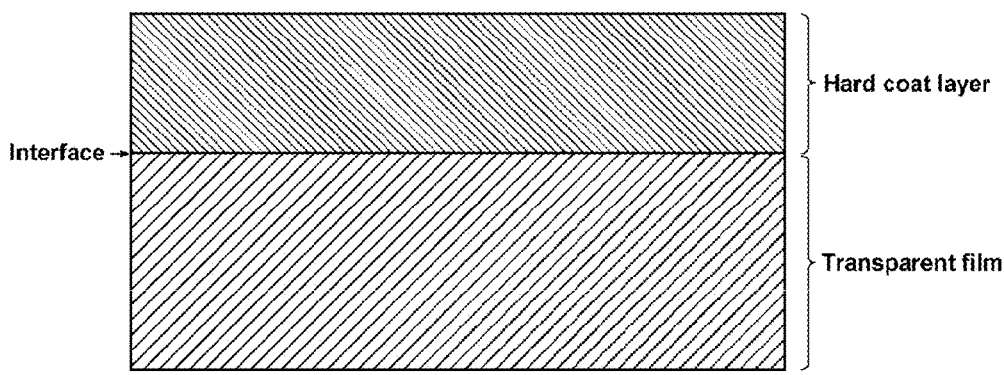
FIG. 13 is a reference cross-sectional view schematically showing each of the hard coat films of Comparative Examples 3, 4 and 6.
Figure 14:
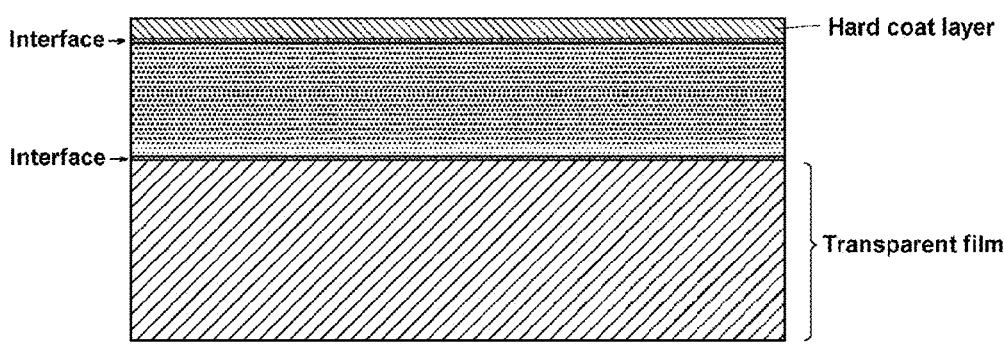
FIG. 14 is a reference cross-sectional view schematically showing each of the hard coat films of Comparative Examples 9 and 10.

FIG. 13 is a reference cross-sectional view schematically showing each of these hard coat films.

The results of the reflection spectrum measurement (see Table 2 and the graphs) show that in each of the hard coat films of Comparative Examples 9 and 10, interfaces exist at a film thickness of 0.8 µm to 1.2 µm and also at a film thickness of 7.3 µm to 7.9 µm, respectively (i.e., interfaces exist in two places located far apart from each other).

In FIG. 15, (a) to (g) shows a cross-sectional photograph of the hard coat films of Examples 1 and 2 and Comparative Examples 1 to 4 and 9. The arrow in the photograph points at the interface.

[Evaluation]

From the above results, in each of the hard coat films of Examples 1 to 5, where an interface exists between the transparent film and the hard coat layer and the refractive index continuously varies in the thickness direction from the interface toward the hard coat layer, the surface hardness and adhesion were excellent, and interference fringes were hardly formed.

In addition, in each of the hard coat films of Examples 1 to 5 after forming the antireflection layer, no interference fringes were formed. Meanwhile, in each of the hard coat films of Comparative Examples 1 to 10, when the antireflection layer was formed, notable interference fringes were formed.

Further, the comparison between Examples 1 to 5 and Comparative Examples 1 to 14 showed that in order to obtain a hard coat film in which the generation of interference fringes is suppressed, the content ratio of the good solvent and the content ratio of the low molecular-weight component in the hard coat layer-forming material are important.

Figure 16:
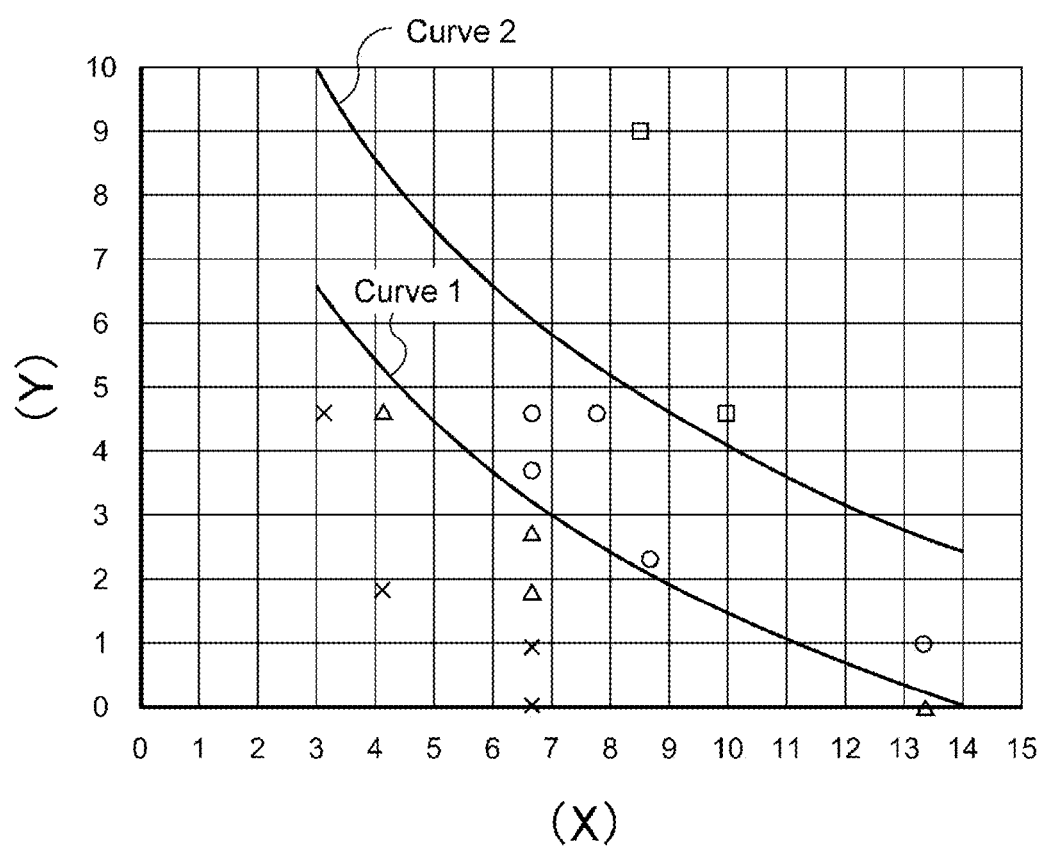
FIG. 16 is a graph showing the content ratio of the good solvent×film thickness plotted against the content ratio of the low molecular-weight component×film thickness for each of the hard coat layer-forming materials used in Examples 1 to 5 and Comparative Examples 1 to 10.

FIG. 16 is a graph showing the content ratio of the good solvent plotted against the content ratio of the low molecular-weight component in consideration of the coating film thickness for each of the hard coat layer-forming materials used in Examples and Comparative Examples 1 to 14. In the graph, the ordinate is a product (Y) of the content ratio of the good solvent (b) and the coating film thickness (t), and the abscissa is a product (X) of the content ratio of the low molecular-weight component (a) and the coating film thickness (t). $Y = b \times t$. $X = a \times t$. Calculated values of these X and Y are specified in Table 1.

The "b" represents the content ratio (mass ratio) of the good solvent based on the total amount of the hard coat layer-forming material taken as 1, and the "a" represents the content ratio (mass ratio) of the low molecular-weight component based on the total amount of the curable compound in the hard coat layer-forming material taken as 1.

The graph shows the X- and Y-values of the hard coat layer-forming materials used in Examples and Comparative Examples as follows: circles are for Examples 1 to 5, triangles are for Comparative Examples 1, 2, 5, and 7, crosses are for Comparative Examples 3, 4, 6, and 8, and squares are for Comparative Examples 9 and 10.

As is obvious from the graph of FIG. 16, the use of a hard coat layer-forming material within the range defined by two curves 1 and 2 makes it possible to form a hard coat film in which the generation of interference fringes is suppressed.

Based on this graph, the curve 1 and the curve 2 are determined approximately as follows.

Curve 1: $Y = -4.274 \ln(X) + 11.311$

Curve 2: $Y = -4.949 \ln(X) + 15.474$

Therefore, the use of a hard coat layer-forming material satisfying the relationships of $$Y \geq -4.274 \ln(X) + 11.311 \quad \text{Formula 1:}$$

$$Y \leq -4.949 \ln(X) + 15.474, \quad \text{Formula 2:}$$

makes it possible to form a hard coat film in which the generation of interference fringes is suppressed.

INDUSTRIAL APPLICABILITY

The hard coat film of the present invention can be used as a constituting member of an optical film, an image display device, an optical lens, a measuring instrument, etc.

1 Hard Coat Film
2 Transparent Film
3 Hard Coat Layer
3a Surface of Hard Coat Layer
5 Interface
6 Antireflection layer

What is claimed is:

1. A hard coat film, comprising:
a transparent film; and
a hard coat layer provided on the transparent film;
wherein an interface that can be detected by a reflection spectrum analysis exists between the transparent film and the hard coat layer, and a refractive index continuously varies in the thickness direction in a region from the interface to a thickness-wise middle part of the hard coat layer without forming an interface that can be detected by the reflection spectrum analysis.

2. A hard coat film, comprising:
a transparent film; and
a hard coat layer provided on the transparent film;
wherein an interface that can be detected by a reflection spectrum analysis exists between the transparent film and the hard coat layer, a transparent film-forming component and a hard coat layer-forming component are present in a region from the interface to a thickness-wise middle part of the hard coat layer, and the transparent film-forming component in the region decreases toward a surface of the hard coat layer without forming an interface that can be detected by the reflection spectrum analysis.

3. The hard coat film according to claim 1, wherein the hard coat layer has a thickness of 3 µm to 15 µm.

4. The hard coat film according to claim 1, further comprising an antireflection layer provided on a surface of the hard coat layer.

5. The hard coat film according to claim 1, wherein a transparent film-forming component and a hard coat layer-forming component are present in a region from the interface to a thickness-wise middle part of the transparent film, and the transparent film-forming component in the region decreases toward a surface of the hard coat layer.

6. A polarizing plate comprising the hard coat film according to claim 1.

7. An image display device comprising the hard coat film according to claim 1.

8. The hard coat film of claim 1, wherein no detectable interface which can be detected by a reflection spectrum analysis is formed in a whole of the thickness direction of the hard coat layer.

9. The hard coat film of claim 2, wherein no detectable interface which can be detected by a reflection spectrum analysis is formed in a whole of the thickness direction of the hard coat layer.

* * * * *